(12) United States Patent  (10) Patent No.: US 8,337,266 B2
Ellis et al.  (45) Date of Patent: Dec. 25, 2012

(54) ELECTRICALLY POWERED WATERCRAFT

(75) Inventors: Ryan Ellis, Los Angeles, CA (US); Richard Brass, Friday Harbor, WA (US); William Poole, Bellevue, WA (US)

(73) Assignee: Volt Boats LLC, Friday Harbor, WA (US)

( * ) Notice: Subject to any disclaimer, the term of this patent is extended or adjusted under 35 U.S.C. 154(b) by 0 days.

(21) Appl. No.: 12/987,829

(22) Filed: Jan. 10, 2011

(65) Prior Publication Data

US 2011/0104963 A1 May 5, 2011

Related U.S. Application Data

(63) Continuation of application No. 12/113,124, filed on Aug. 15, 2008, now Pat. No. 7,887,381.

(60) Provisional application No. 60/915,074, filed on Apr. 30, 2007, provisional application No. 61/048,914, filed on Apr. 29, 2008, provisional application No. 61/368,582, filed on Jul. 28, 2010.

(51) Int. Cl.
*B63H 20/08* (2006.01)
(52) U.S. Cl. .............................. 440/53; 440/6
(58) Field of Classification Search .................. 114/347; 440/6, 53, 54, 56, 112
See application file for complete search history.

(56) References Cited

U.S. PATENT DOCUMENTS

| | | | |
|---|---|---|---|
| 1,840,949 A | 1/1932 | Harvey | |
| 1,911,192 A | 5/1933 | James | |
| 2,429,774 A | 10/1947 | Schultz | |
| 3,324,821 A | 6/1967 | Laughlin | |
| 3,587,512 A | 6/1971 | Patterson | |
| 3,685,481 A | 8/1972 | Mansell | |
| 4,226,206 A | 10/1980 | Wilson | |
| 4,529,386 A | 7/1985 | Smith | |
| 4,668,195 A | 5/1987 | Smith | |
| 4,734,066 A | 3/1988 | Burgess | |
| 4,734,068 A * | 3/1988 | Edwards | 440/56 |
| 5,005,798 A * | 4/1991 | McCoy | 248/642 |
| 5,336,119 A | 8/1994 | Lais et al. | |
| 5,481,997 A | 1/1996 | Arndt | |
| 5,725,401 A * | 3/1998 | Smith | 440/6 |
| 5,937,785 A | 8/1999 | Murray, III | |
| 6,210,242 B1 | 4/2001 | Howard et al. | |
| 6,280,267 B1 | 8/2001 | Griffith | |
| 6,458,004 B2 | 10/2002 | Van Breems | |
| 6,478,639 B1 | 11/2002 | Covell, III | |
| 6,532,884 B2 | 3/2003 | Profitt et al. | |
| 6,736,084 B2 | 5/2004 | McDonough et al. | |
| 6,855,016 B1 | 2/2005 | Jansen | |

(Continued)

FOREIGN PATENT DOCUMENTS

EP 08747260.1 11/2009

(Continued)

*Primary Examiner* — Lars A Olson
(74) *Attorney, Agent, or Firm* — Jensen & Puntigam, PS

(57) ABSTRACT

Improvements to electrically powered watercraft including kayaks are disclosed. The watercraft comprises a hull defining a cavity and a battery powered retractable propulsion unit. The retractable propulsion unit can be retracted into the cavity with powered or unpowered means. Various retractable propulsion units are disclosed, including propulsion units that are steerable wherein the thrust can be selectively directed. Specific embodiments to improve the steerability of electrically powered watercraft are disclosed. Mechanisms for disengaging the steering controls from the retractable propulsion units are also disclosed. Locking mechanisms for locking the retractable propulsion unit in an extended or fully retracted position are also disclosed.

18 Claims, 10 Drawing Sheets

U.S. PATENT DOCUMENTS

| | | |
|---|---|---|
| 7,032,531 B1 | 4/2006 | Caples |
| 7,121,225 B1 | 10/2006 | Caples |
| 7,458,542 B2 | 12/2008 | Chow |
| 7,887,381 B2 | 2/2011 | Brass |
| 2002/0195039 A1 | 12/2002 | Anderson |
| 2004/0242088 A1 | 12/2004 | McCann |
| 2004/0255836 A1 | 12/2004 | Hopkins |
| 2005/0268833 A1 | 12/2005 | Conrad |
| 2006/0009092 A1 | 1/2006 | Krietzman |
| 2006/0254495 A1 | 11/2006 | Eckert |
| 2007/0012236 A1 | 1/2007 | Caples |
| 2007/0017431 A1 | 1/2007 | Hopkins |
| 2007/0125285 A1 | 6/2007 | Conrad |
| 2009/0042461 A1 | 2/2009 | Walton |

FOREIGN PATENT DOCUMENTS

WO PCT/US2008/062114  11/2008

* cited by examiner

ELECTRICALLY POWERED WATERCRAFT

CROSS REFERENCE TO RELATED APPLICATIONS

This application is a continuation in part of U.S. patent application Ser. No. 12/113,124, filed Aug. 15, 2008 now U.S. Pat. No. 7,877,381, titled "Improved Electrically Powered Watercraft", which claims the benefit of PCT/US2008/062114, filed Apr. 30, 2008, titled "Improved Electrically Powered Watercraft", and U.S. Provisional Application No. 60/915,074 filed Apr. 30, 2007, titled "Electric Kayak" and U.S. Provisional Application No. 61/048,914 filed Apr. 29, 2008, titled "Electric Kayak". This application also claims the benefit of U.S. Provisional Application 61/368,582, filed Jul. 28, 2010, titled "Electric Kayak". The entire contents of these related applications are hereby incorporated by reference.

BACKGROUND

Small, human-powered watercraft (e.g. kayaks, canoes, dinghies, rowboats, launches, tenders, etc.) are as popular as ever throughout the world for their simple, quiet and economical operation. In recent history, some attempts have been made to motorize such small watercraft, albeit with mixed success, whether due to lack of sufficient power, noisy operation, complex systems or expenditure of significant resources. However, a need persists for a small traditionally human-powered watercraft to have auxiliary and redundant power available.

For example, we have found that there are some hobbyists who have built their own crude electric watercraft. The majority of these projects are undertaken by anglers who enjoy fishing from a small boat, and need mobility without paddling. Most of the time, these anglers use a marine lead acid battery along with a trolling motor to achieve their goals. However, these embodiments are not well suited for portability, as the propulsion system does not have a readily removable and/or retractable feature. Further, the properties of the motor, hull and propulsion system are rather primitive, leading to a very low efficiency (rendering either slow speed, short duration or significant weight from heavy motor and its power source). In this regard, a lightweight traditional craft capable of efficient and quiet motorized operation, having high maneuverability, with a retractable and/or removable motor would be highly advantageous.

Similarly, sea kayaking is another hobby enjoyed by many people around the world. In many cases, hobbyists endeavor a multi-hour or even multi-day kayaking trip and find that their muscles fatigue. In such cases, it would be of tremendous benefit to have a propulsion system on the kayak to assist the kayaker to travel farther and/or faster than that by human propulsion alone. Moreover, some kayakers may lack the endurance for extended kayaking trips, so a self-propelled kayak that gives paddlers a chance to rest would be appealing. A variety of demographic groups, such as anglers, touring kayakers, and wildlife spectators, would also be interested in a self-propelled kayak or other small watercraft.

Using electric power has several advantages. First, it allows the watercraft to enter regulated bodies of water, where gas motors may not be used. Second, it is also quiet, which is important to both anglers and wildlife spectators. Lastly, it is environmentally friendly, which is a characteristic likely very important to most kayakers and those that regularly enjoy the outdoors. Finally, it is significantly less expensive to use electric power instead of petroleum based fuel.

Waterside resorts or rental businesses would also benefit from the development and availability of an efficient, quite, portable electrically powered watercraft for recreational boating. These buyers will have unique needs because a large percentage of their clientele will have minimal boating experience, and as such the traditional paddle may not provide a suitable form of propulsion. By way of example, an electric kayak would be safer than a traditional kayak, since a fatigued kayaker could return to shore using electric power. Likewise, elderly or physically-challenged individuals would be able to participate, whereas traditional human-powered kayaking or canoeing might be too demanding given the physical challenges.

Several attempts have been made to design and build such a motorized watercraft, as exhibited by other patents and publications. For example U.S. Patent Application Publication No. 2002/0195039 ("Anderson") discloses a motorized kayak having a gasoline powered inboard-style propulsion unit. However, Anderson exhibits several shortcomings in the art, namely: noise and pollution emitted from the combustion engine, the need to carry a fuel in the hull, weight from such a combustion engine and a fuel tank being permanently affixed into the hull of the watercraft, and a severe a lack of steerability, among other shortcomings.

Likewise, U.S. Pat. No. 5,937,785 ("Murray") discloses a similar inboard-style propulsion unit with an electric motor rather than a combustion engine. However, Murray also exhibits similar shortcomings with respect to its permanent motor and power source weight, its lack of steerability as the thrust from its propulsion system, and like Anderson, the thrust from the propulsion unit cannot be directed to ease steering.

U.S. Patent Application Publication No. 2007/0012236 ("Caples") discloses a retractable propulsion unit utilizing an electric motor—but such motor is not steerable. In this regard Caples, like Anderson and Murray, exhibits a distinct deficiency in steerability. More particularly, our research and testing has shown that it is very difficult to turn a motorized kayak wherein the propulsion unit cannot be steered. In essence, a human being exerting a force with a paddle or even a rudder (approximately $\frac{1}{10}^{th}$ of a horsepower or less) is working against the force of a motorized propulsion unit ($\frac{1}{2}$ horsepower or greater, likely five, ten or more times the horsepower of the paddle or rudder). Quite simply, a human exerting force on a paddle is an insufficient force to overcome the forward thrust and forward inertia of a motorized watercraft.

Thus, what is badly needed in the art is an electrically powered watercraft having a properly designed retractable propulsion unit. It is preferable that such a retractable propulsion unit be steerable—thereby having the ability for its thrust to be controllably directed in different directions thus compensating for the difference in power between the human and the propulsion unit. In order to stow the propulsion unit, it is frequently necessary to create a cavity in the hull that is exposed to the water. Significant improvements in efficiency can be rendered if the hull can remain streamlined without unnecessary turbulence created by this cavity. Further, significant improvements in portability can also be rendered to the user if such a propulsion unit (and its power supply) are readily removable from the watercraft.

Thus, while a need exists for certain improvements in propulsion, steering, efficiency and portability in small traditionally human-powered watercraft, such needs have not been filled by those practicing in the art.

SUMMARY

Embodiments of the present invention are directed toward the above described improvements, and more particularly toward an electrically powered watercraft. The improved electrically powered watercraft detailed herein evidences significant advancements in steerability, portability, efficiency and other tangible aspects. These advancements collectively render a motorized watercraft virtually indistinguishable in feel, weight and appearance from an ordinary non-motorized kayak.

Other embodiments of the present invention are directed toward the particular retractable propulsion units, steering mechanisms and other features configured in such a motorized watercraft. By way of example, a propulsion unit can be configured to extend below the hull of the watercraft, or alternatively be retracted and stowed inside the cavity in the hull of the watercraft. Some embodiments described herein allow the retractable propulsion unit to also be steerable, such that the vector of the thrust from the propeller can be directed to steer the craft. Since some embodiments disclosed also utilize conventional steering mechanisms (e.g. a rudder), disclosed devices also provide a way to selectively integrate these conventional steering mechanisms with the steerable, retractable propulsion unit. Thus, a propulsion unit can be selectively disengaged from the conventional steering mechanism of the craft. Such features provide substantial steerability and flexibility not exhibited by the prior art.

Various options and approaches of embodiments of the invention are also discussed throughout the technical disclosure, including additional components, characteristics and aspects that enhance the performance of various embodiments. It is understood that while small electrically powered watercraft (e.g. a kayak) is an exemplary application used to describe specific details of a best mode of practice of the invention, the presently disclosed invention contemplates other embodiments and watercraft not necessarily disclosed within the present examples.

BRIEF DESCRIPTION OF THE DRAWINGS

Embodiments of the invention are illustrated by way of example, and not by way of limitation, in the figures of the accompanying drawings and in which like reference numerals refer to similar elements, wherein.

DETAILED DESCRIPTION

Figure 1A:
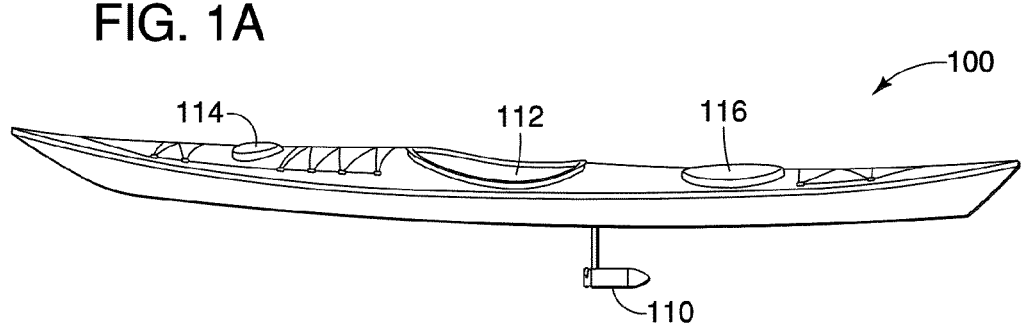
FIG. 1A is a side view of an electric kayak with rear-positioned propulsion according to an embodiment of the invention.

In the following description, for the purposes of explanation, specific details are set forth in order to provide a thorough understanding of the invention. However, it will be apparent that the invention may be practiced without these specific details. In other instances, well-known structures and devices may be depicted in block diagram form in order to avoid unnecessary obscuring of the invention. Section titles and references appearing within the following paragraphs are intended for the convenience of the reader and should not be interpreted to restrict the scope of the information presented at any given location.

Various aspects and features of example embodiments of the invention are described in more detail hereinafter in the following sections: (i) Functional Overview, (ii) Steerable & Retractable Propulsion Units, (iii) Other Components And Considerations, and (iv) Conclusion.

Functional Overview

The improved electrically powered watercraft disclosed in the present technical disclosure solves various aforementioned shortcomings posed by the prior art. More particularly, a motorized propulsion system in a traditional human powered personal watercraft such as a kayak provides for a redundant and backup propulsion system. Such a motorized propulsion system expands the use of the personal watercraft both in persons who can utilize the watercraft, and for those utilizing the watercraft, further expands the range and speed of the watercraft when in use. Further, such a redundant propulsion system increases the safety of the watercraft as it is capable of propulsion even if the user becomes unable to paddle or otherwise fatigued during the course of operation.

For the purposes of the present disclosure, various embodiments are directed toward a battery powered electric kayak, which will be discussed at length. However, such discussion should not be construed to limit the scope of the present disclosure and present invention to only a motorized kayak. It is noted that the various propulsion, steering and speed control systems, or other components described herein, while described herein for purposes of improving a traditional kayak, can also be utilized in a number of other embodiments including canoes to row boats or other personal watercraft.

At the basic level, embodiments of the present invention primarily comprise a hull of a personal watercraft and a propulsion unit. Preferably, the propulsion unit can be retracted into the hull for stowing and transport. Preferably, the watercraft should remain lightweight, sleek and the performance will not noticeably differ from that of a normal watercraft when paddled. Because the propulsion units are typically battery powered (though not restricted to such), embodiments of the present disclosure are typically quiet so that the user will enjoy the same experience as in a non-motorized traditional personal watercraft.

Preferred embodiments of the present disclosure are economical to design and manufacture, as they are typically developed using conventional marine grade components. As such, maintenance and replacement of such components is readily available in the marketplace.

Turning to FIG. 1A, a personal watercraft 100 is illustrated having a propulsion unit 110 in its rearward portion, located just behind the seat 112.

Figure 1B:
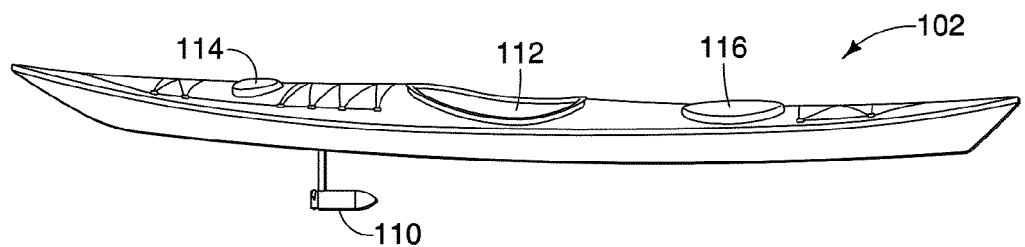
FIG. 1B is a side view of an electric kayak with front-positioned propulsion unit according to an embodiment of the invention.

Alternatively, as illustrated in FIG. 1B, a personal watercraft 102 can have a propulsion unit 110 configured in its forward portion, just in front of the seat 112.

Typically, embodiments of the present invention can be manufactured by design or otherwise modified or retrofitted into traditional non-motorized personal watercraft. If one is proceeding with the latter course, typically modifications are made to the hull of the personal watercraft using ordinary materials such as wood or fiberglass.

Typically, a cavity is designed into the hull, or an insert is mounted into the hull providing a cavity for a propulsion unit to be retracted or stowed. The cavity (and insert if used) should be of the same size and shape of the desired propulsion system, thereby avoiding excess voids in the cavity. Further, the hull should have as few discontinuities as possible thus reducing drag created by turbulence.

Steerable & Retractable Propulsion Units

Figure 2A:
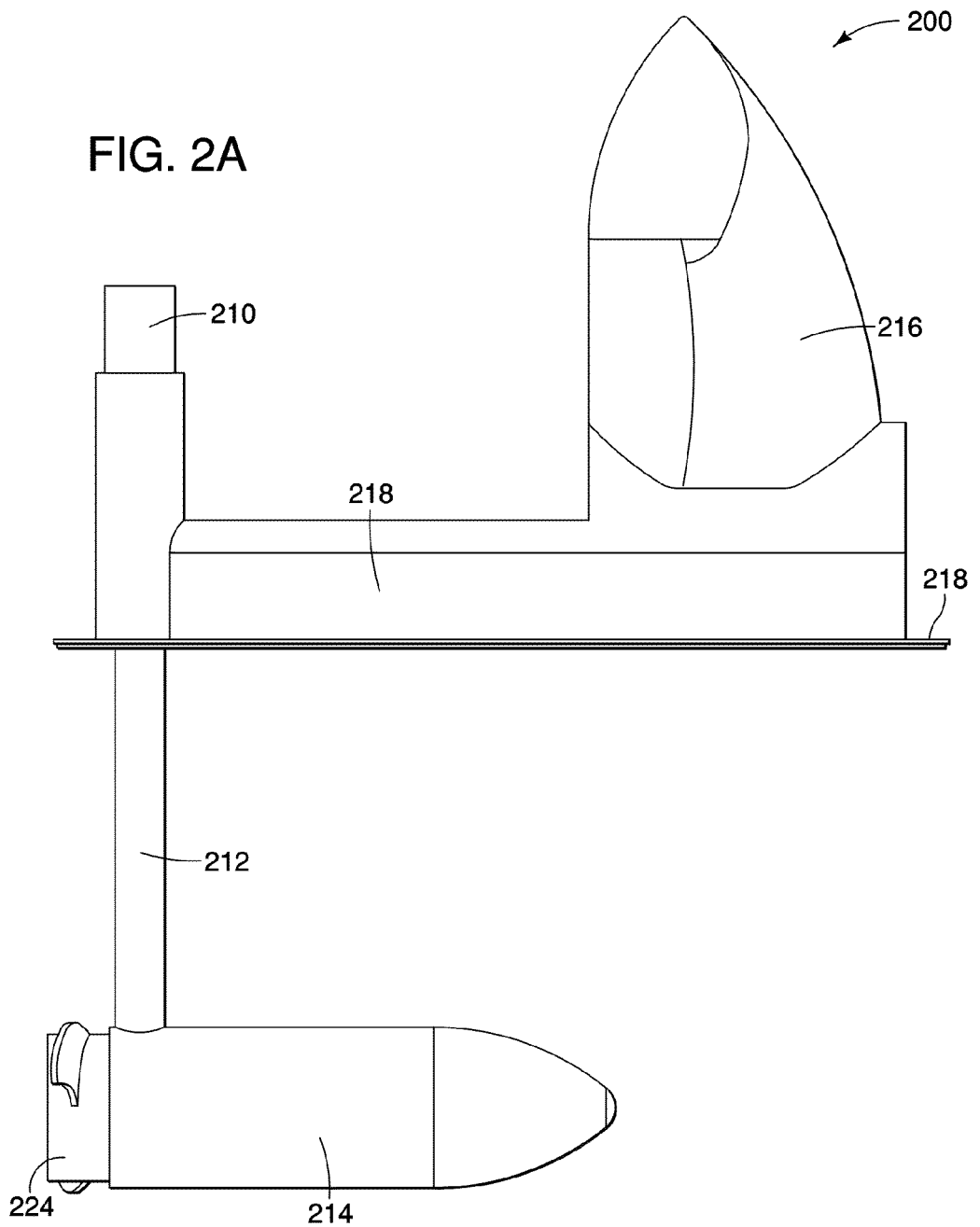
FIG. 2A is a side view of a steerable retractable propulsion unit in an extended position according to an embodiment of the invention.

Turning to FIG. 2A, a steerable retractable propulsion unit 200 is illustrated in an extended, operating configuration. Generally speaking, the retractable propulsion unit 200 comprises an assembly 210 coupled to a shaft 212, which in turn is coupled to a motor 214. In an extended, operating configuration, the motor 214 is generally positioned below the shaft 212 and assembly 210. The assembly 210 can be rotated in order to steer the propulsion unit 200 and thus the kayak.

Figure 2B:
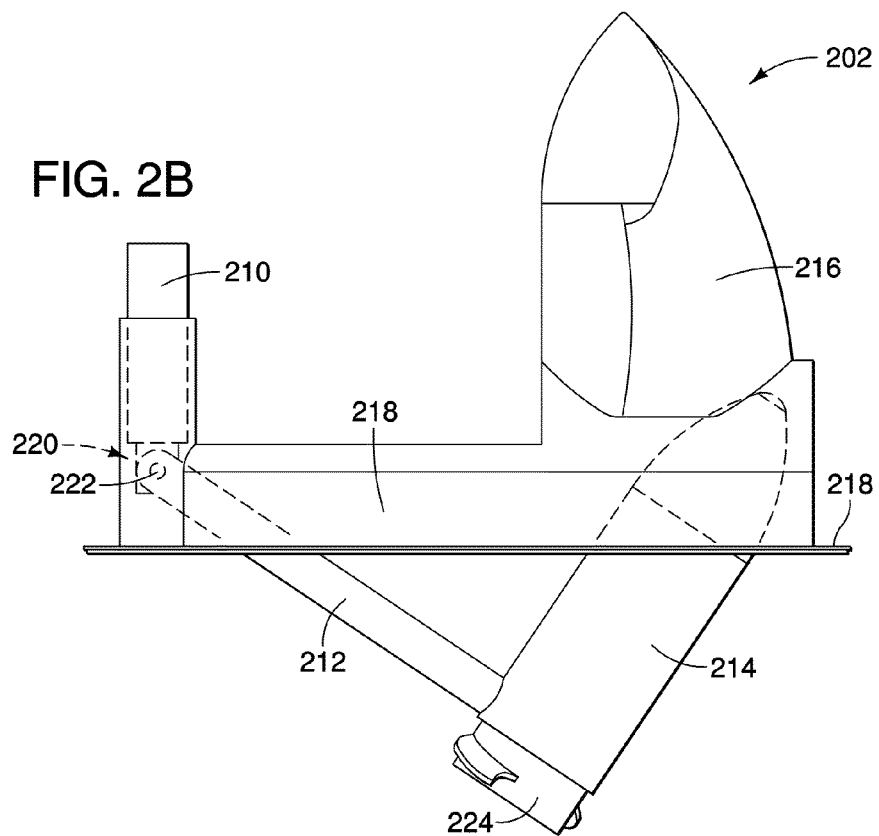
FIG. 2B is a side view of a steerable retractable propulsion unit in a partially retracted position according to an embodiment of the invention.
Figure 2C:
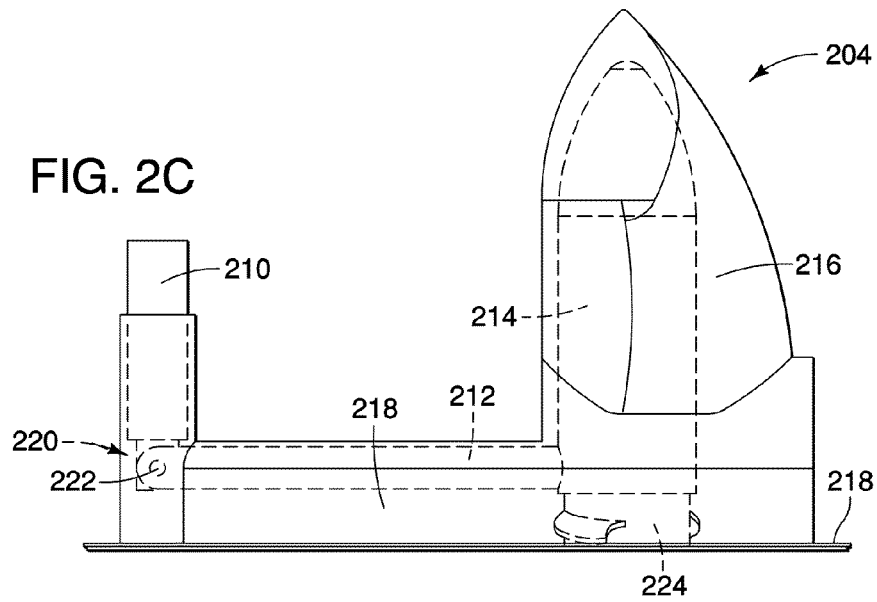
FIG. 2C is a side view of a steerable retractable propulsion unit in a fully retracted position according to an embodiment of the invention.

Turning to FIG. 2C, a retractable propulsion unit 204 is illustrated in a fully retracted, stowed configuration. More particularly, a motor 214 of the propulsion unit 204 can be folded into a cavity 216 defined by the hull 218, thereby reducing the drag on the kayak.

Preferably, the cavity 216 into which the motor folds is substantially covered across the bottom of the hull 218 so that water (not shown) passing along the hull 218 surface remains undisturbed when the kayak is in operation without using the propulsion unit 204.

Turning to FIG. 2B, a retractable propulsion unit 202 is illustrated in a partially retracted configuration, namely either when being retracted into the cavity 216 or being extended into the environment for operation.

The retractable design of the propulsion unit 200 can be implemented in numerous ways. Preferably, the motor 214 folds up by releasing a pin (not shown) holding the shaft 212 vertical at the pivot point 220. This allows a user (not shown) to pull the motor 214 upward by a wire (not shown) attached to the motor 214, such that the motor 214 is pulled into the cavity 216.

In preferred embodiments, the motor 214 can be positioned into the cavity 216 by releasing the pin (not shown) and allowing the motor 214 to propel itself into the cavity 216. More particularly, a propeller 224 continues spinning and propelling the motor 214, but since the shaft 212 can pivot at pivot point 220, the motor 214 propels itself into cavity 216. Optionally, a catching or locking mechanism (not shown) can be configured to prevent the motor 214 from falling back downward once it has been positioned upward into the cavity 216. Such a method for retracting the motor 214 eliminates the need for a secondary means to retract the motor 214 into the cavity 216. In order for this method to work smoothly and efficiently, the speed of the motor 214 needs to be restricted, preventing the motor 214 from swinging up too forcefully and possibly damaging the hull 218. Alternatively, a secondary motor can be used to retract the propulsion system.

Figure 3A:
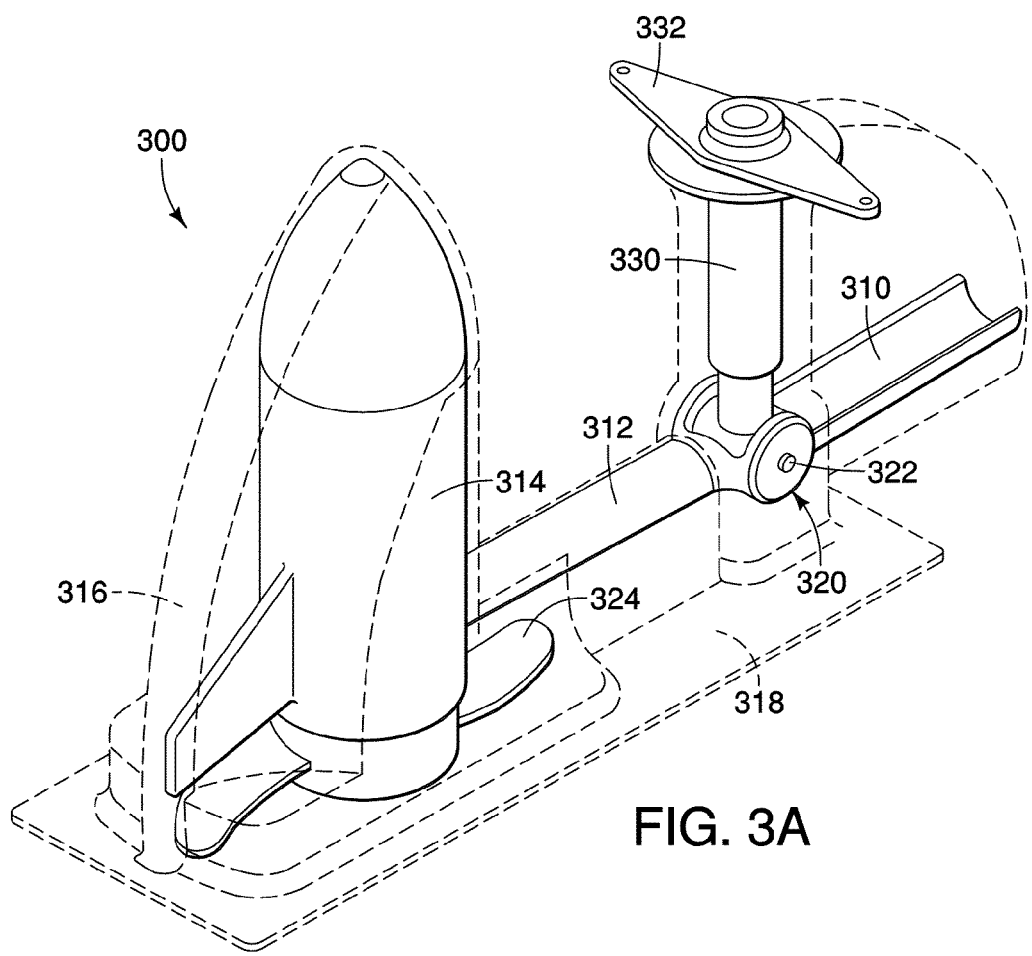
FIG. 3A is an isometric view of a steerable retractable propulsion unit in a fully retracted position according to an embodiment of the invention.

Turning to FIG. 3A, another retractable propulsion unit 300 is illustrated in a fully retracted, stowed configuration. As illustrated, the propulsion unit 300 further comprises one or more cover plates 330 over a cavity 316 to reduce drag both when a motor 314 is in a fully retracted configuration (as shown in FIG. 3A) and when the motor 314 is in an extended configuration (as shown in FIGS. 3B and 3D).

One challenge presented by one or more plates 330 in such a design is the need to substantially seal the closure or seam of the one or more plates 330. If water (not shown) leaks behind the one or more plates 330, this phenomena can increase weight on the kayak and negatively affect maneuverability of the kayak.

Figure 3B:
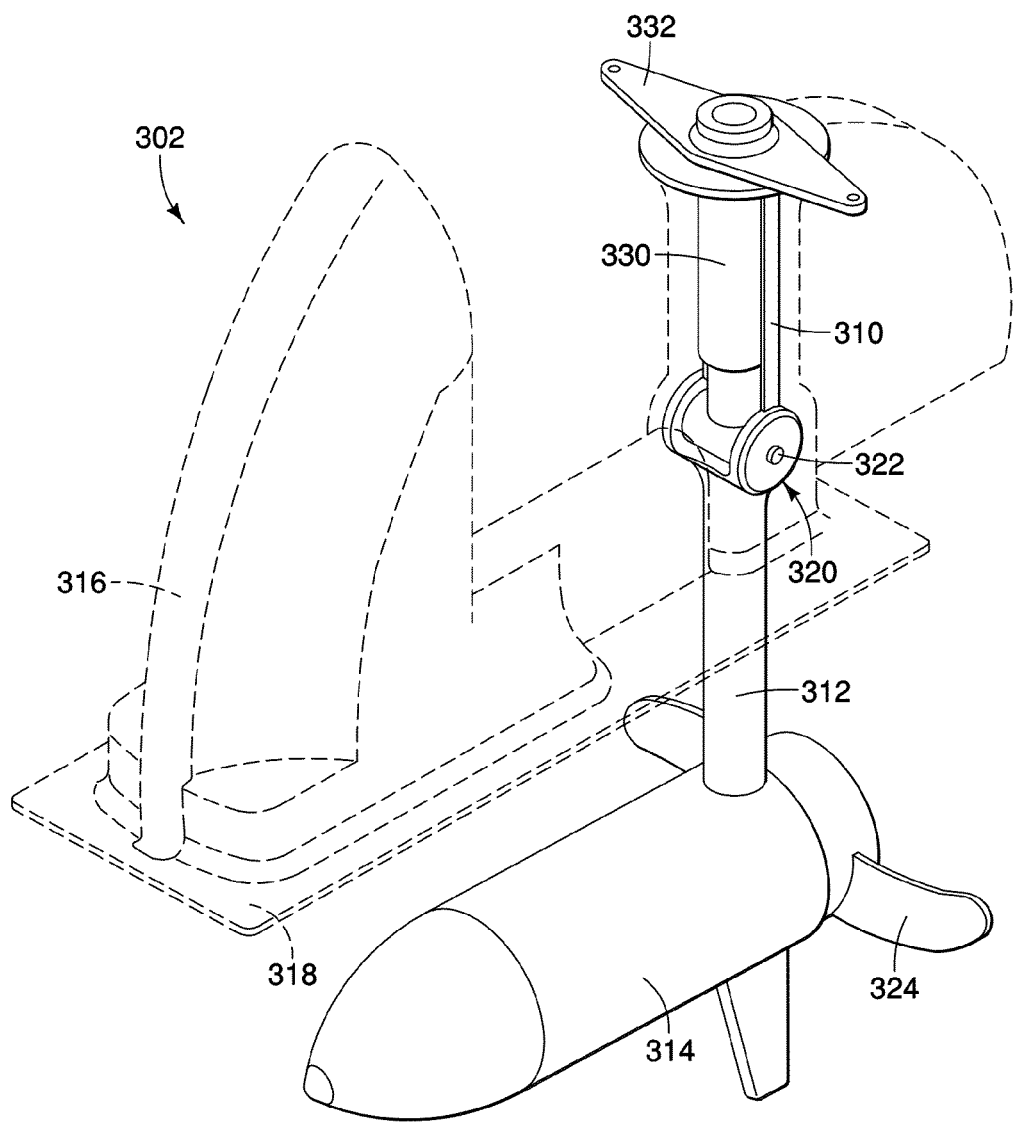
FIG. 3B is an isometric view of a steerable retractable propulsion unit in an extended position according to an embodiment of the invention.

The retractable design illustrated in FIGS. 3A and 3B allows a kayak to have identical appearance to that of a typical kayak both when the motor 314 is in use and when the motor 314 is not in use. Further, rotation of the assembly 310 can provide for steering capabilities of the propulsion unit 300 without adding a supplemental steering unit such as a rudder (not shown). The steering bracket 332 connects to the rudder cables (not shown) which are connected to conventional controls (e.g. foot pedals, not shown) allowing the user to steer the motor 314.

Preferably, the rudder is connected to both the conventional controls and also to a bracket 332 on the propulsion units 300 and 302. A mechanism 330 selectively and fixably couples assembly 310 to bracket 332, thereby allowing the conventional controls for the steering to also control the steering of the the motor 314. When propulsion units 300 and 302 are not in the extended position (thus not in use), mechanism 330 disconnects assembly 310 from bracket 332, thus disengaging the propulsion units 300 and 302 from the conventional controls. One such mechanism would be a combination of a plunger and a groove to accommodate this selective coupling need, although a variety of possibilities for such a mechanism exist. In such an embodiment, the locking mechanism 330 can be a plunger (not shown) that pulls the assembly 310 into a groove (not shown) on the mechanism 330 when the motor 314 is extended. Certain other mechanisms providing for alignment of the propulsion units 300 and 302 (thereby preventing mechanical conflict when the propulsion units 300 and 302 are retracted) is preferable.

Further, propulsion units 300 and 302, as desired, can also be configured to be fully removable when the kayak is to be used without motorized propulsion, namely by using a selective (e.g. snap in, snap out) connection (not shown) that secures the shaft and establishes electrical connections. Such a selective connection can be positioned either at the top of the shaft 312 or at a middle point along the shaft 312.

Such a selective connection, by way of example, can be similar to a paddle locking mechanism with two spring loaded buttons on either side of a tube that is inserted into the slightly larger accommodating reciprocal shaft. Configured on the sides of the receptacle shaft are two holes into which fit the spring loaded buttons. Inside each end of the shaft is an end of a watertight connector.

Figure 3C:
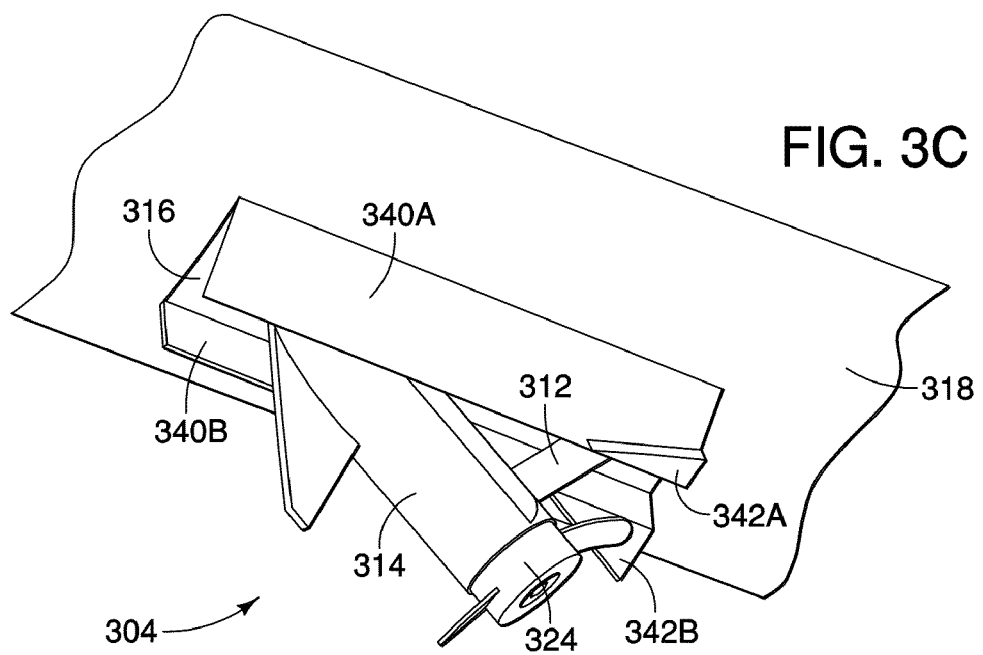
FIG. 3C is an isometric bottom view of a steerable retractable propulsion unit having bombay doors in a partially retracted position according to an embodiment of the invention.
Figure 3D:
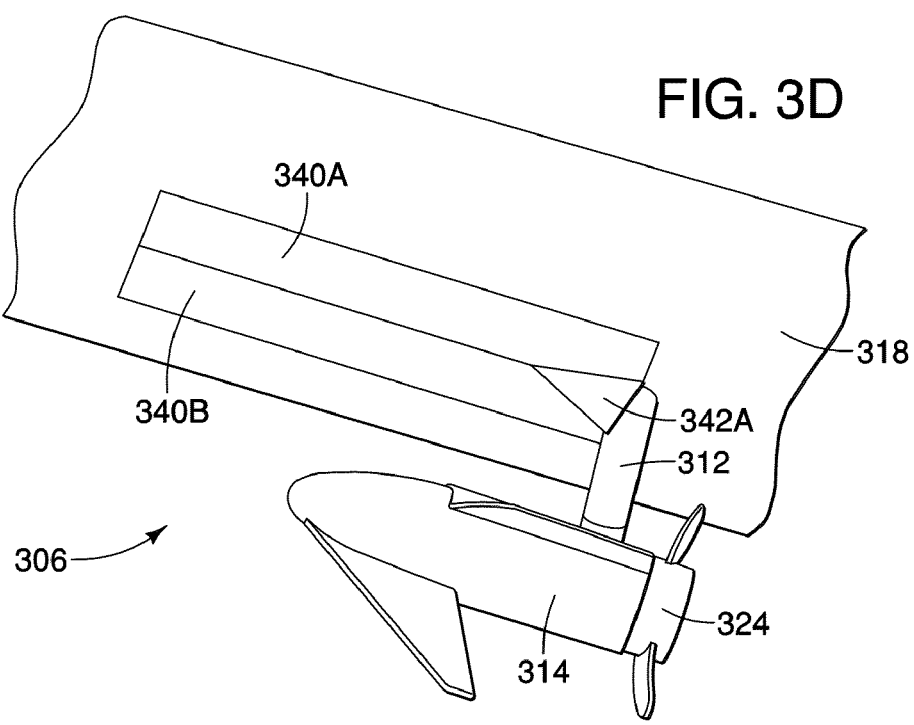
FIG. 3D is an isometric bottom view of a retractable propulsion unit having bombay doors in an extended position according to an embodiment of the invention.

Turning to FIG. 3C, a retractable propulsion unit 304 is illustrated in a partially retracted configuration, namely either when being retracted into the cavity 316 or being extended into the environment for operation.

Turning to FIG. 3D, an alternate view of one or more plates 340A and 340B is illustrated with a retractable propulsion unit 306 in an extended configuration. The one or more plates 340A and 340B are spring loaded in a closed position such that movement of motor 314 forces the one or more plates 340A and 340B open by either pushing on them from above (when the motor is in the retracted position and is extending downward), or by spreading them using one or more cams 342A and 342B on the part of the one or more plates 340A and 340B that are nearest in proximity to the shaft 312. The cams 342A and 342B are angled outward and downward with respect to the shaft 312. Thus, movement of the shaft 312 forward forces the one or more plates 340A and 340B apart and downward. Preferably, one or more locking mechanisms (not shown) are configured upon the shaft to lock the shaft into either a fully retracted position or extended position, as desired.

Figure 5A:
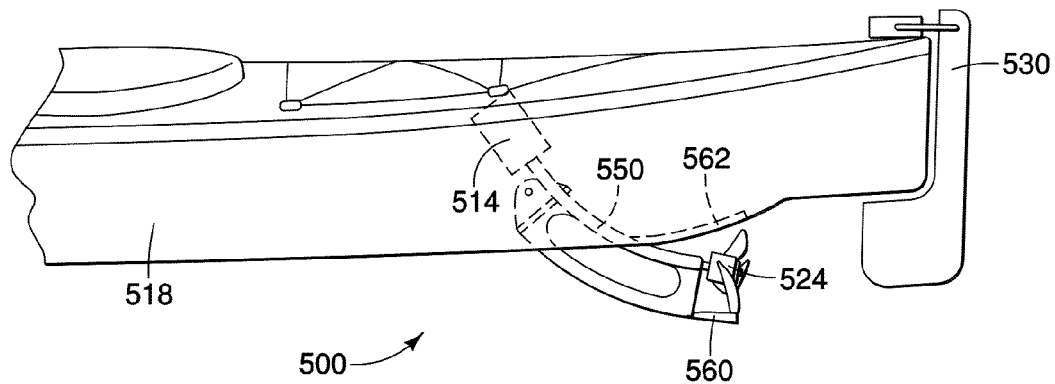
FIG. 5A is a side view of a retractable propulsion unit in an extended position according to an embodiment of the invention.
Figure 5B:
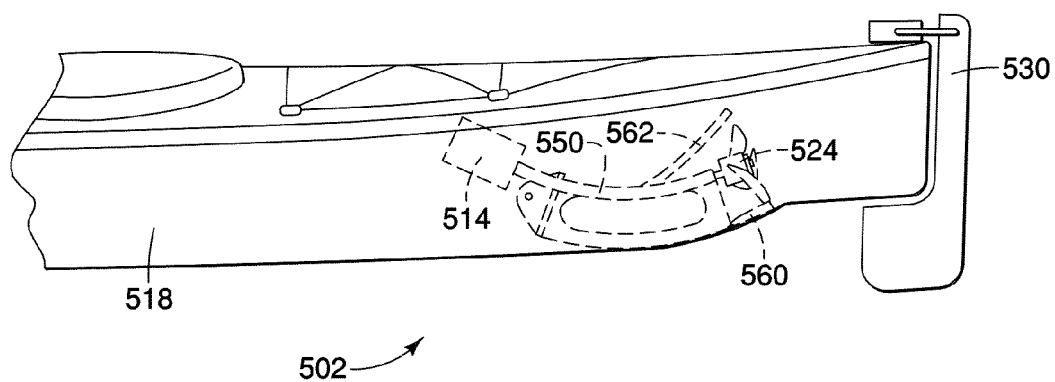
FIG. 5B is a side view of a retractable propulsion unit in a fully retracted position according to an embodiment of the invention.

Turning to FIGS. 5A and 5B, an alternate retractable propulsion unit 500 and 502, respectively, is illustrated. As shown, rather than a motor 514 being submerged, the motor 514 is instead contained within a hull 518 of the watercraft. A driveshaft 550 transfers power from the motor 514 to a propeller 524. FIG. 5A illustrates the propulsion unit 500 in an extended, operating configuration, whereas FIG. 5B illustrates the propulsion unit 502 in a fully retracted, stowed configuration. Note that preferably a cover plate 560 is mounted under the propeller, such that when the propulsion unit is retracted it covers the substantial opening of the cavity (not shown) in the hull where the propulsion unit 502 is stowed. A plate connected to the propulsion assembly can also cover the area above the propeller when the unit is fully extended downward. This would prevent cavitation and reduce drag when the prop is fully extended below the boat.

Figure 6A:
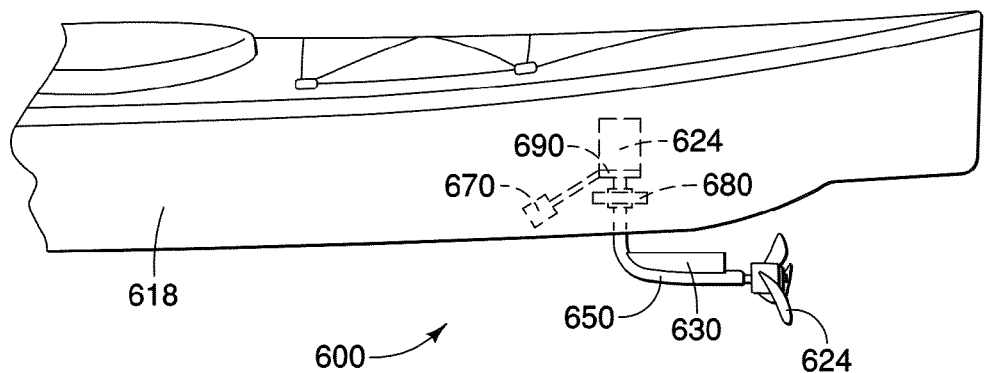
FIG. 6A is a side view of a steerable retractable propulsion unit in an extended position according to an embodiment of the invention.

Turning to FIG. 6A yet another alternate embodiment of a steerable retractable propulsion unit 600 is illustrated. More particularly, the propulsion unit 600 comprises a motor 624 providing rotational force, a propeller 624, and a flexible driveshaft 650 transferring rotational force from the motor 614 to the propeller 624. Preferably, a rudder 630 is coupled to the flexible driveshaft 650, thereby enhancing the steering capabilities of the propulsion unit 600. A mount 680 provides means for the flexible driveshaft 650 to be both coupled to a hull 618, but allows the flexible driveshaft 680 to rotate about a vertical plane extending through the longitudinal axis of the watercraft. Mount 680 also allows the driveshaft 650 to rotate about its axis, thereby providing selectively directional thrust from the propeller 624. Typically in the embodiment as illustrated, the driveshaft 650 can be selectively steered by attaching control cables (not shown) to the motor 614 or driveshaft 650.

A linear actuator 670 is coupled to the motor 614 with the utilization of a ring bearing 690 or other device (thereby allowing the linear actuator 670 to be coupled to the motor 614 but still allowing the motor 614 to rotate in conjunction with the flexible driveshaft 650).

Figure 6B:
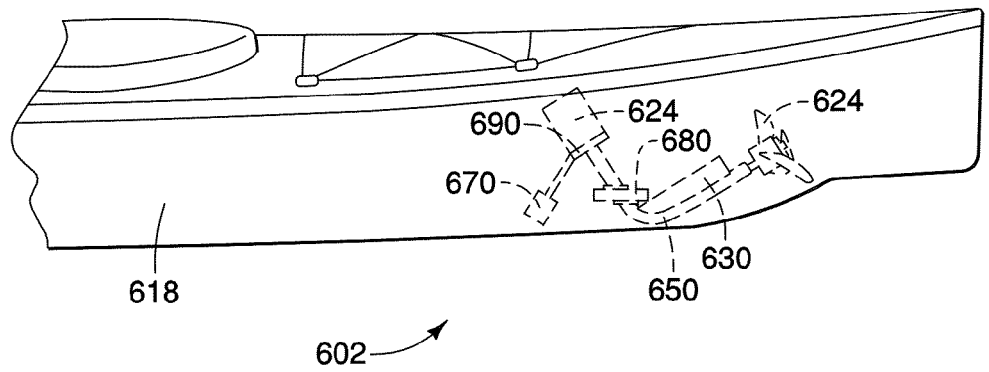
FIG. 6B is a side view of a steerable retractable propulsion unit in a fully retracted position according to an embodiment of the invention.

As illustrated in FIG. 6B, an electrically powered watercraft 602, similar to the electrically powered watercraft of 600, is shown in a fully retracted position for transport, storage or non-motorized use. It is noted that the propeller 624 and flexible driveshaft 650 are preferably retracted into a cavity (not shown) in the hull 618.

Alternatively, a folding propeller (not shown) can also be used as a substitute for a standard propeller—thereby providing some advantageous steering capabilities when the propeller 624 is not in use.

One of the advantages of the retractable propulsion unit design is the ability to absorb energy from a collision of the propulsion unit against an underwater object in the environment. Because kayaks and other small watercraft are sometimes used in shallow waters, it is helpful that such a design be utilized that is resilient to interaction with the bottom. The retractable propulsion unit design is able to fold upward when impacted, which will protect the shaft from experiencing extreme forces. Such a design can be configured to comprise a latch that releases when a given impact force is exceeded.

One shortcoming with relying on the motor to move the motor into the cavity is that when the battery does not have sufficient power remaining, the motor cannot propel itself into the cavity in the fully retracted position. This shortcoming can be overcome by manually pushing the motor into the cavity and locking it if a lock is configured. Since such a lock does not take any energy to hold the motor inside the cavity, the motor will remain fully retracted despite the power loss. However, this is not an elegant alternative, as the user would have to get underneath the kayak.

An alternative approach is to use powered means (e.g. a small motor, hydraulic pump, linear actuator, cable, morse cable, winch, etc.) to extend and retract such a propulsion unit. For example, a linear actuator or a cable can be connected to a lever arm of the propulsion unit to extend or retract the propulsion unit. Using such powered means to extend or retract the propulsion unit alleviates the need for a secondary locking mechanism, but also requires more battery energy.

Figure 4A:
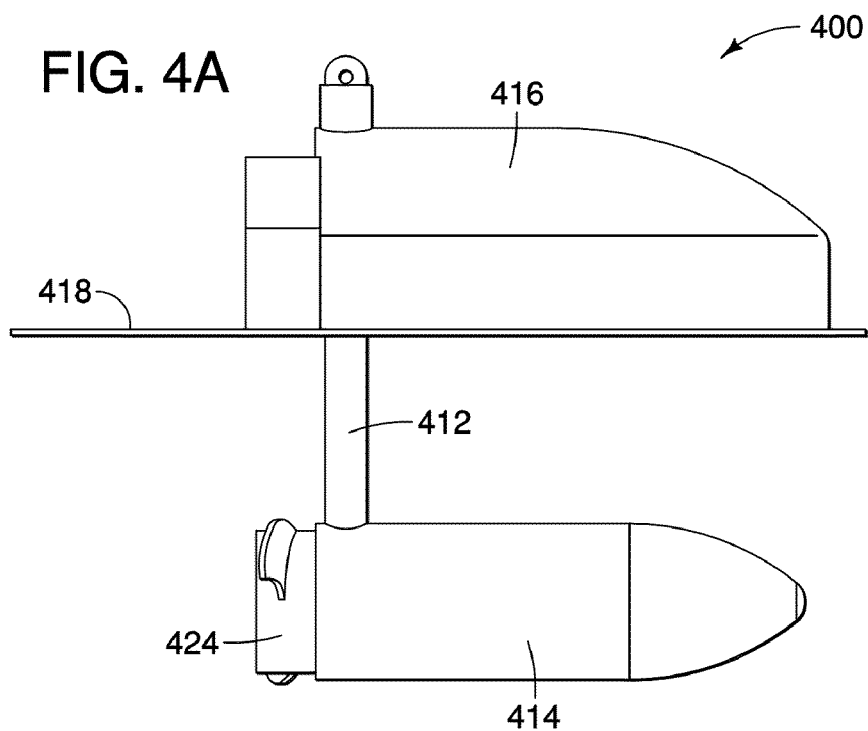
FIG. 4A is a side view of a steerable sliding propulsion unit in an extended position according to an embodiment of the invention.

Another design alternative for a retractable propulsion unit is a sliding propulsion unit, in which a shaft slides vertically in the kayak, retracting the motor into a shaped cavity within the hull. Turning to FIG. 4A, a sliding propulsion unit 400 is illustrated in an extended (operating) configuration. As noted, the motor 414 is situated generally below a hull 418 by a shaft 412, providing sufficient clearance for a propeller 424 to clear the hull 418 when in operation.

Figure 4B:
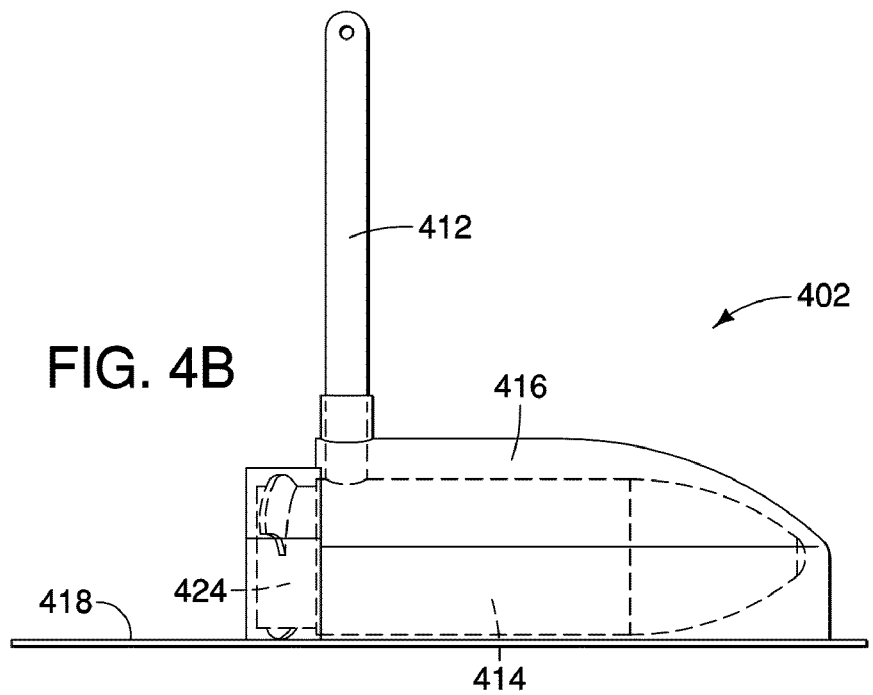
FIG. 4B is a side view of a steerable sliding propulsion unit in a fully retracted position according to an embodiment of the invention.

As illustrated in FIG. 4B, the motor 418 and propeller 424 can be retracted and stowed inside a cavity 416 defined by the hull 418 by pulling the shaft 412 upward. Shaft 412 can alternatively be pulled up by means (not shown) of a pulley system or a separate retracting motor. With a pulley system, a user may physically pull the motor assemblage up using a rope or small winch. With a separate retracting motor, such a retracting motor could act directly upon the shaft 412 using a rubber wheel or act using a gear upon notches in the shaft 412 to pull the motor assemblage up.

Additional features can also be added to the sliding propulsion unit design. For example, one or more plates (not shown) can be attached to the shaft 412 thereby sealing the cavity 416 when the motor 414 is extended. Utilizing such one or more plates can reduce drag, increasing kayak speed and battery efficiency. Similarly, the bottom of the motor 414 can be contoured such that it fits smoothly into the cavity 416 when the motor 414 is retracted—likewise reducing drag and increasing efficiency. Further, shaft 412 can also be designed to telescope (not shown) so it does not require as much vertical space in the kayak.

If allowed by the configuration, one of the benefits of the sliding propulsion unit 402 is the ability to retract the propulsion unit 402 into the cavity 416 of the hull 418 my manual means (e.g. pulling the shaft 412 upward) while the watercraft is still in the water. This allows the propulsion unit 402 to be retracted even if the power source for the motor 414 is depleted.

It is further preferable, to the extent possible, to also configure a hinge or pivot point (not shown) in shaft 412 to accommodate the impact of the motor 414 with an underwater object. For example, a hinge with a safety pin (not shown) could be added to allow the motor to absorb more collision force.

Other Components and Considerations

While it is possible to design a custom motor to be built for the motorized personal watercraft described herein, it is also cost effective and of reasonable effort to adapt off-the-shelf marine motors (e.g. a fishing trolling motor). For example, a typical electric trolling motor with 30 lbs of thrust has been shown to be more than sufficient. By utilizing and customizing such an off-the-shelf motor, the motorized personal watercraft can be designed with economics, maintenance and support in mind.

One of the motor modifications deals with the retractable or sliding features of the personal watercraft, including when the motor is impacted by an external force (e.g. an underwater object). To accomplish this, as illustrated in FIGS. 1A and 1B, it is typically possible to rotate a motor 110 one hundred and eighty degrees so that the motor 110 becomes a pull-style motor (as opposed to a standard push-style trolling motor). Thus, if the motor 110 strikes an underwater object when the kayak is moving forward, the motor 110 will automatically swing backward and upward.

To turn a standard push-style trolling motor into a pull-style motor, the battery leads on the motor are reversed. Doing so typically still preserves the various variable speeds previously provided for forward and reverse.

Typically, when reversing such a trolling motor, it is also advisable to further streamline the propeller with a nose cone (not shown). Such a nose con can be created out of conventional materials such as metal, fiberglass, plastic or wood.

Turning briefly to FIG. 2B a pivoting mechanism 220 is illustrated, allowing the shaft 212 to rotate about a point at the pivoting mechanism 220. The pivoting mechanism can be configured from machined components. One component is the shaft 212 of the motor. Typically, the shaft 212 is shortened from original motor and a low carbon steel shaft 212 can be machined into its place. The shaft 212 connects to the assembly 210 with a small diameter pin 222 to create the pivot for the shaft 212. The pivot mechanism 220 serves as the physical means to couple the motor to the kayak.

It is further preferable to have a mechanism to lock the motor in the extended and fully retracted positions, (as illustrated by FIGS. 2A and 2C, respectively). When in use, the motor is in the extended position. In some embodiments, a strong electromagnet (e.g. a 40-lb force electromagnet) can be configured (not shown), so that the strength of the electromagnet will attract the shaft 212 and keep it secure.

An electromagnet is a good way to lock the motor in the down position because the magnetic power can be turned on and off, depending on the position of the motor and arm. When the motor 214 is engaged in a pulling forward direction, the force of the motor will be in favor of the shaft 212 against the hull 218, such that the hull 218 will prevent the motor from extending beyond an extended, operating position.

However, in the configuration above, if the motor is to be operated in the water in reverse, it is advisable to configure a stronger electromagnet to keep the arm locked in the extended position for reverse speeds. Alternatively, a linear motion solenoid (not shown) or other electronics can be configured to assist with keeping the motor 214 in an extended position kayak travels in reverse.

When not in use, the motor 214 is typically locked in the fully retracted position inside the cavity 216. In one embodiment, a pulling linear motion solenoid (not shown) can be used for this purpose.

Embodiments of the present invention can be readily manufactured or retrofitted from conventional fiberglass kayaks. Therefore, preferably all major components described herein should be integrated into the kayak hull using fiberglass or conventional fiberglass attachment means (e.g. adhesives, screws/nuts, rivots, etc.).

It is further preferable to configure a speed control system in embodiments of the present invention. Typically, the speed control system allows selective power settings to change the speed of the motor. Such a variable power control system can be configured in a number of ways, including the conventional speed control devices typically distributed with such a motor.

There are several types of batteries that can be considered for the power source for a motor in the embodiments described herein, including alkaline, lead acid, nickel cadmium (NiCd), lithium ion, and nickel metal hydride (NiMH). Lithium ion and NiMH are the preferred battery types in such embodiments, particularly due to their higher power-to-weight ratio and their reduced potential for environmental contamination (e.g. as compared to NiCd batteries). As illustrated in FIGS. 1A and 1B, there are typically two areas in which batteries (not shown) can be configured to be stowed during operation: a front hatch 114, a rear hatch 116 or directly under the seat 112. These access points provide ample space to place or remove the batteries from the personal watercraft.

It has been tested that approximately seven 12V, 13000 mAh NiMH batteries connected in parallel yields sufficient power to serve as a power source for the motor, yielding approximately 91 ampere hours. This amount of power provides an electric kayak configured with the motor described above approximately 3 hours of runtime at maximum draw.

It is preferable in some embodiments or applications to configure one or more convenient chargers for the batteries, thereby allowing the batteries to be charged without removal from the watercraft. Such chargers can be on-board chargers intended to plug into conventional alternating current (e.g. 120V) or vehicle charging adapters (e.g. 12V, 24V).

Alternatively, in other embodiments where the personal watercraft will not have access to electricity or fresh batteries, it is advisable to configure one or more solar cell panels to recharge the batteries utilizing the energy from sunlight. Such solar cells are readily available for conventional voltages such as 12V systems and can provide one or more hours of battery power per day. In some embodiments, such power is sufficient to allow the personal watercraft to be utilized on a beach or remote area without ever charging or removing the batteries from the watercraft.

If necessary, the batteries can be split between multiple locations. For example, in FIG. 1A, the front hatch 114 can house five of the seven batteries, while the remaining two batteries can be located under the seat 112. Having two locations house the batteries helps to balance the added weight of the motor and the other components, as it is important for the kayak to maintain balanced. More particularly, the batteries in the front hatch 114 counter balance the weight of the added components in the rear portion of the boat, such as the motor 110. The two batteries under the front seat would be situated near the center of gravity of the kayak under the seat 112. Preferably, the battery packs and storage compartments are designed with flexibility and water resistance in mind as well.

Preferably, there are at least two safety components that control the battery power. A kill switch (not shown) and a circuit breaker (not shown) are preferably connected in series with the overall circuit for the motor 110 and other features. The kill switch should be attached with a strap to the user's hand or leg. As such, if the strap will be pulled (disconnecting the circuit) if the user attempts to exit the craft without first detaching the strap. A breaker rated for approximately 60 amps has been found sufficient to protect the motor and other electronics from overcharge, short circuit or other electrical anomalies.

Returning to FIGS. 5A and 5B, as noted earlier, an optional steering unit 530 can be added to such a personal watercraft where increased maneuverability is desired. Preferably, such a steering unit (e.g. a rudder) would be retractable also, such that both the propulsion and steering of the watercraft can be retracted.

Without respect to any particular figure, it is further preferable to have a propeller configured on the motorized personal watercraft which is optimal for the load, speed and conditions desired. For the purposes of a motorized personal watercraft such as an electric kayak, it has been found that a typical 2 or 3 bladed trolling motor propeller is sufficient to suit the needs of the propulsion units described herein.

It is also advisable in some embodiments to configure either a temporary (e.g. inflatable) or permanent outrigger to stabilize the personal watercraft further. Such an example would be an outrigger which can be extended outward and inflated upon need and deflated and folded back into the hull when not in use.

As noted earlier, additional specifications, design/manufacturing considerations and operational details for embodiments of the present invention can be found within the content of the provisional applications as recited in the first paragraph of this technical disclosure.

Additional Features as Described in U.S. Provisional Application 61/368,582

In some embodiments, one or more of the features described in U.S. Provisional Application 61/368,582, which is incorporated by reference herein, may implemented, for example as described in this section.

Overview

Figure 7:
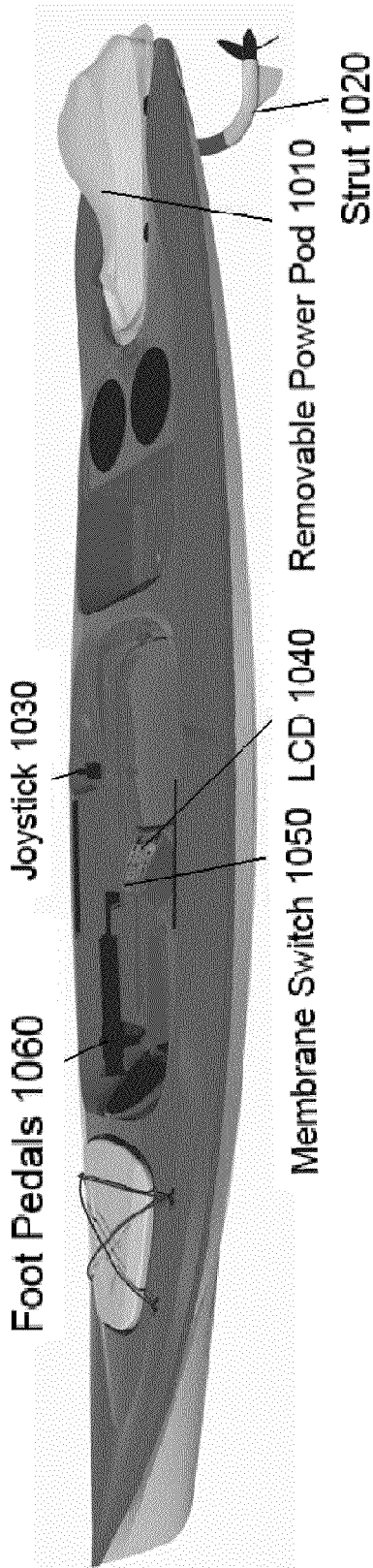
FIG. 7 illustrates a view of an example K1 type watercraft discussed herein.

Referring to FIG. 7, in the transom of the boat (referred to in FIG. 7 as the K1 1000) may be a removable power pod 1010 which houses a gearbox and a controller. The gearbox may be coupled to a propeller by a strut 1020. The strut 1020 may extend through a hole in the bottom of the removable power pod 1010. The bottom of the gearbox may have a boot on it which acts to seal off water from the inside of the removable power pod 1010.

The removable power pod may be dropped into the transom of the boat and may be surrounded by the hull of the boat. Wires may allow the removable power pod to be disconnected from the main boat electrically and physically. Cables may connect two battery pack controllers (BPCs) to deliver power and interpret control signals from various points throughout the boat.

Batteries can be housed in various points throughout the boat. These batteries may be removable as well. A battery management system, or BMS, may be housed in a designated position. The BMS may interpret data from individual BPCs that may be housed in each individual battery container. The BPCs may interpret information from the battery and send that information to the BMS, and the BMS may control the charging and discharging of the batteries. More can be learned about the batteries in the BMS section and Battery Charger section later in this document. The batteries can be charged on or off the water. There may be a 120 V AC input jack installed. This connector may have signal wires that route to the BMS and power wires that route directly to the BPCs in the batteries. A custom charger can be used off the water as well to charge the batteries individually.

Several control options may exist for the kayak: joystick, remote, GPS controlled navigation, electric foot pedals and buttons. A joystick 1030, which can be positioned at a designated position, may send signals to the controller indicating both the desired drive motor speed and position of the strut. Foot pedals 1060, which may have force sensing resistors installed inside them, can be positioned at designated positions. These foot pedals can also control the position of the strut by allowing the controller to interpret the resistance values of the integrated force sensing resistors. A remote control can also send signals to the controller, directing the motion of the strut and power delivered to the drive motor. If desired, a cruise control mode can be engaged by pressing a button on the membrane switch. This may be handled through software in the controller and can be used with any control method. An autopilot system can also control the boat. This is discussed more in the autopilot section.

Power can be delivered to 12 V outlets throughout the boat. These outlets can be standard cigarette lighter outlets or wired to power other devices such as bow and stern lights. A membrane switch 1050 and LCD 1040 may be positioned in front of the user's body, and may display information about the boat status and allow the user to interact with the boat through the membrane switch. Waterproof (IP67) thru-panel connectors may be used at any point where cables go through the deck of the boat.

Strut

The strut 1020 may have a propeller at the end of it, coupled to a motor using a flexible drive shaft. One end of the flex shaft may be coupled directly to the motor by a square end. The other end of the flexible shaft may be coupled to the propeller through a sealed bearing and drive dog system. The benefit of a flexible shaft to power the vessel in some embodiments may include providing higher efficiency compared to traditional right-angle gears. It may reduce drag on the boat as compared to an underwater drive motor, with a larger diameter motor casing than the strut maximum diameter. It may be less likely to entangle with weeds since the shaft has a curvature, rather than a "croquet-like" extension underwater that may be likely to catch weeds and debris.

On the end of the strut, there may be 2 cutters (Prop Cutters), positioned roughly 180 degrees apart from each other. They may be used to cut weeds and fishing line, should they tangle between the strut and propeller in the gap. The cutters could be located in different places and have a different cutting design, like a serrated blade. The strut also may have a skeg that protects the prop during underwater impact. There could be multiple skegs around the circumference of the strut for added protection.

Prop

The propeller may have a removable "cone" on the end to cover the drive dog nut and reduce turbulence. The strut could be made out of a high durometer rubber or other semi-rigid material. The cone hub may be threaded so it can be attached to the propeller hub easily.

Gearbox

The gearbox may perform a number of functions. It may turn the strut about the gravitational axis (z-axis) and may raise and lower the strut and propeller into and out of the water to reduce drag and make it possible to traverse shallow water. There may be three sensors in the gearbox: two that indicate the position of the strut about the rotational axis and tell the position of the strut (port to starboard), and one that indicates whether the gearbox is raised or lowered.

Breakaways

The gearbox may have two breakaway systems (one about the rotational z-axis and one about the y-axis). The breakaway mechanisms may prevent the strut or gearbox from suffering damage when the strut or prop are impacted in the deployed position. A raise/lower breakaway may allow the gearbox to rotate forward if the strut is impacted by an object in the water without damage to the gearbox or the strut. A left/right breakaway may allow an object to impact the strut laterally without damaging the strut or the gearbox.

Two steering sensor systems may act independently of each other and may have two benefits: they may act as a redundancy for each other, and they may allow the gearbox to auto-align after a left/right (Clockwise/Counterclockwise) breakaway event.

Electric Steering Mechanism

The kayak may have a gearbox and controller that controls the position of a strut. Until now, there have been no mass-produced, electrically controlled small vessels. Electric steering is generally relegated to larger craft.

A steering drive can be controlled by a joystick 1030, foot pedals 1060, GPS-controlled autopilot, remote control, or other input device, including buttons. When a direction is indicated, the controller may send positive or negative current to the steering motor. Gears between the steering motor and the main drive shaft transfer power. The main drive shaft's position may be sent to the controller by two sensor systems: a Magnetic Rotary Sensor may interpret 180 degrees of rotation of the strut, while a magnetic pickup may be tripped when magnets come within proximity of the sensor. The Magnetic Sensor Rotary Gear may be coupled to the main drive shaft, which in turn may be directly coupled to the drive strut. The Sensor Magnet may be fixed to the Magnetic Sensor Rotary Gear. When the main shaft rotates, the Sensor Magnet may spin, and the change in magnetic flux may be interpreted by the Magnetic Rotary Sensor. When the magnetic rotary sensor interprets the position of the magnet to be the correctly indicated position, as per the user's command using one of the above mentioned control methods, the controller may stop applying current to the steering motor and the strut may be considered to be in the correct position.

Port/Starboard Breakaway

If the strut were impacted from the side, in some embodiments it may strip the gears inside the gearbox and destroy the propulsion drive, leaving the user stranded. A Port/Starboard breakaway mechanism may allow the strut to be impacted without damage to the system. A top disk of the Port/Starboard breakaway may sit atop the main drive gear and rubber pins may fit through holes in the top disc and main drive gear. The pins may push through to another disc on the opposite side of the drive gear. The two discs may have flats which index them to the position of the main drive shaft. The main drive gear need not have flats, so it may be able to spin freely if it were not connected to the two discs, which may be held to the drive gear by rubber pins. When the strut is impacted, the top and bottom discs may attempt to rotate, but the main drive gear may be fixed in place because it may be held by the gear set which may be not moveable unless current is applied to the steering motor. Therefore, the top and bottom disc begin rotating, and the rubber pins may flex and slip out of the bottom disc. The top disc rises up and may then be able to rotate freely because the flat may only extend up the width of the disc, so when the pins pop up, the disc may push up and out of the flat. The main gear and disc now hold in place and the main shaft may spin freely until the object impacting the strut no longer presses on the shaft. Once the user clears the obstruction, she may press a button on the controls to re-center the strut. At this point, the two sensors that give the strut position may act together to find the center position. The controller may go into seek mode, where it may for example apply current to the steering motor until the magnetic sensor reads the second magnet on the shaft. The controller may then interpret the signal from the Rotary Sensor and may set that signal position as zero or centered. This position may now correspond to the strut being directly in back of the boat, and the user can go back to operating the boat normally.

Strut and Propeller Retraction and Vertical Breakaway

Retracting the propeller and strut is important for all boats, but it may be especially important in certain embodiments such as for some small boats that traverse shallow water, like kayaks, to avoid underwater impact and to allow the user to get into shallow waters which fish tend to inhabit. There is typically one raised position that is better for the strut to be in than any other. A strut may only retract directly toward the stern of the boat; therefore, the sensor may indicate that the strut is in the correct position to retract fully. A sensor may allow the gearbox and strut to be raised in the straight back position. The system may also automatically center the strut in the stern position and then to retract upward.

The gearbox system may include the ability to retract and may employ a retracting process described herein. The controller may deliver positive or negative current to the Retracting Motor or Raise Lower motor (also referred to as a secondary motor). The Raise Lower Motor, which may comprise a gear motor, may turn a major gear that houses four magnetic limit switches. When this gear turns, the Raise Lower Strut may be rotated downward and the Strut Roller may begin to roll along the Gearbox Housing Bracket. As the gear continues to rotate, a portion of the gearbox eventually rests in the Gearbox Bracket Divot. The strut may push the gearbox up and it may rotate about a pivot point. This rotation may also rotate the strut and propeller out of the water. During this process, a magnetic limit switch may be triggered by the magnets. This limit switch indicates to the controller when the gearbox is in various positions. The controller may be programmed to stop the Raise Lower Motor at a designated position.

When the gearbox is deployed, the raise lower strut roller may roll along the housing bracket and may eventually impact a spring. The spring may be coupled to another spring which presses on a rubber stopper, rubber hook or other partially rigid and partially flexible latch structure. The rubber stopper may have a lip on it which holds down the gearbox enclosure so that under normal conditions, the gearbox may not rotate forward unless the spring is released by the wheel. Just before the Gearbox Housing Lip comes into contact with the rubber stopper, the roller wheel may impact the spring, and the stopper may fall backwards because of gravity. The gearbox lip may rotate all the way down. The main gear may continue to rotate, which may cause the gearbox raising strut to continue to rise upward. Eventually, the gearbox enclosure may rest on a stopper, the strut may rise off the spring, and the stopper may be pushed back into position over the gearbox enclosure lip. At this point, the gearbox can be retracted if the lip forces up against the stopper, pushing the stopper out of the way; by bending it (since it may be made of a flexible material such as rubber); or by the spring being pressed again.

A vertical breakaway may occur if the gearbox is forced to rotate without the spring being depressed. The flexible nature of the latch/rubber stopper allows it to give way under the force of an impact. The gearbox and strut may be weighted such that the gearbox will rotate back to a designated position if there is no longer an object pushing on the strut to force the gearbox up. A rubber stopper under the gearbox enclosure may absorb impact from the collision of the gearbox hitting the bracket after a breakaway event.

Removable Power Pod

The Power Pod 1010 may comprise a removable hull component containing propulsion and other systems within an attachment. The Power Pod, which may include an enclosure for the turning mechanism and electronic controls, can be dropped into the back of the boat and secured in place rigidly with the rest of the boat. The Power Pod may interlock with the hull and may have fasteners at 4 points to hold the pod in place. A connector such as an IP67 (NEMA standard) connector may be disconnectable, allowing the Power Pod to be removed. Removal of the Power Pod may allow paddlers to avoid carrying the added load of the pod with the boat. Handles can be positioned around the pod to make carrying and transport more convenient.

Foot Pedal Steering

Two foot pedals 1060 may control the direction of the craft by indicating an electrical resistance level to the controller. The user may put his foot on the foot pedal, and may then rotate the ball of the foot to press the lever, which pivots about a point. When the lever is pressed, a plunger may press through a rubber membrane and impact a rubber ball. The rubber ball may press on a force sensing resistor. The greater the force on the resistor, the lower the electrical resistance the force sensing resistor has. The controller may interpret the resistance from two foot pedals positioned on the left or right (port or starboard) sides of the boat. The sum of the resistance levels of the two foot pedals may give the final position of the strut. When the foot is released off the lever, a spring positioned near the plunger may push the plunger away from the rubber ball, and the force on the force sensing resistor may be removed. Such a force sensing resistor foot pedal mechanism could be applied to control any steering device electrically.

Battery Management System

A tri-battery implementation may include a battery system that can use many different battery chemistries and capacities. Battery pack controllers in each of the battery packs may deliver information to the battery management system about the needs of individual battery packs, and may discharge them in parallel. The BMS with a custom charger may charge the battery packs serially.

Definitions

The following terms are used throughout this document:
BMS—Battery Management System
Battery Container—Hosts one to five battery packs, plus the battery management system.
Battery Pack—Boat battery including electronics
Battery—battery, e.g. a 10 Ah, 24VDC battery
Load—The controller is the load attached to the BMS
Charger—Volt Boat battery charger attached to the BMS Battery Pack Features Battery pack features may include:
1. Micro controller may comprise 64 Bytes of non-volatile memory.
2. A/D converter may measure battery pack voltage, current, and/or temperature.
3. Battery Pack protection for over current (OC) during charge and discharge; thresholds may be set in hardware. OCV may isolate battery pack.
4. Battery Pack protection for over voltage and under voltage (OV, UV) during charge and discharge; thresholds may be set in hardware. OV and UV may isolate battery pack.
5. Micro controller may compute charge (Coloumb counting) during charge and discharge.
6. Micro controller may compute estimated run time and remaining charge based on battery parameters stored in memory.
7. Micro controller may communicate with BMS controller via a 2-wire interface (I2C).
8. Micro controller may transfer charge information, voltage information, and current information to the BMS controller. It may also provide battery information for charging and discharging to the BMS controller.
9. Micro controller may identify the battery chemistry to the BMS controller.
10. Battery pack may include features for managing certain common battery types:
    a. LiFePo4—Battery pack may include per cell protection and monitoring of the battery pack, plus interface for Host communication.
    b. NiMH—Battery pack may include protection plus interface for Host communication.
    c. LeadAcid—Battery pack ma include protection plus interface for Host communication. Battery and controller may have protection for peak discharge and charge over currents and voltage measurement.
11. Per cell voltage monitoring.
12. During charge, a cell may be bypassed if the cell voltage becomes higher than a reference voltage.
13. During discharge, the entire battery pack may be isolated if any cell voltage drops below a reference voltage.
14. Reference voltages may be set in hardware.
15. Micro controller may capture which cell(s) trigger OV/UV events.

Battery Information Stored in Non Volatile Memory

The following information may be stored in non volatile memory:
1. Battery design capacity
2. Battery cycle count
3. Operating voltage
4. Operating current
5. Operating temperature
6. Charge instructions for voltage, current and temperature
7. Remaining capacity
8. Chemistry ID
9. Serial number/Lot number
10. Battery supplier ID Manufacturing date
11. Software version (if not implied by serial number)

BMS Controller

The BMS controller may comprise a micro controller that may communicate with all battery packs, for example via a 2-wire interface (I2C). The BMS controller may connect, disconnect, and isolate the battery packs during charge and discharge. It may collect information from the battery packs and send it to the kayak controller for display purposes (capacity, runtime, warnings, and alerts). It provides individual pack information as well as aggregate information for all battery packs.

The BMS controller may be able to identify the battery location or slot. In order to do this, an additional sensor wire with a resistor may be added to the connector cable for each individual slot. This resistance value may indicate into which slot the battery is plugged when the BMS controller receives information from the battery. Alternatively, the BMS may identify which connector was in slots 1, 2, 3, and 4 in the battery case. This might result in installation difficulties, though, if the cables were not clearly marked.

Battery Discharging Process

Batteries may be connected and discharged in parallel. A MOSFET may be used to prevent one battery that is a higher voltage from delivering current to another that is lower voltage.

Battery Charging Process

During charging process, the BMS may provide battery charging information to the charger. During the charging process each battery may be isolated, allowing charging the pack according to its unique charging profile. The BMS may recognizes the profile data on each battery pack and send that information to the charger, which may interpret the profile information and charge accordingly. The BMS controller may be positioned between the battery pack and charger.

The BMS may determine when a battery pack is completely charged. It may then isolate the charged battery pack, connect the next battery pack, provide charging information to the charger, and wait until charging is complete. The BMS controller may communicate with the kayak controller and the charger for example via a 3-wire interface (SPI).

A bus or rail system may interconnect the battery packs and connect them to the BMS in some embodiments. The BMS controller board may be relatively small. The signal wires may come together at the BMS controller. The battery pack power cables can simply be interconnected in some embodiments.

Battery Pack, Kayak Controller, and BMS Connection

Connection options may include:
1. One female socket in the battery container that permits connection to either the kayak controller or the charger.
2. 2 BMS modules (one internal, one external) to connect between the kayak and the charger during the charging process.
3. A custom charger that has a BMS system integrated into it. Then, provide the user with both the integrated charger BMS combination and the onboard BMS system.

The positive and negative terminals on the battery container may serve to discharge and to charge the battery.

Battery Discharge Warnings and Damage Prevention

Various thresholds may be defined, which batteries may reach during discharge:
1. Halfway Point—the point where the amount of energy remaining in the battery system is equal to the amount used during the trip.
2. 30 minutes remaining—the point at which the amount of energy remaining in the battery system is only anticipated to yield another 30 minutes of charge at the current speed.
3. 10 minutes remaining—The point at which the amount of energy remaining in the battery system is only anticipated to yield another 10 minutes of charge at the current speed.
4. Theoretical Zero—The point at which there is only 10 minutes of charge remaining given the current speed for the battery system.
5. Actual Zero—the point at which one battery's hardware protection engages and shuts it down.
6. Boat Shutdown—the point at which all batteries have reached Actual Zero.

Points 1, 2, 3, 4, and 6 all refer to the complete battery system and point 5 refers to each individual battery. Therefore, point 4 could be reached by one or more batteries before any of the other thresholds are reached and the user would still be able to operate the boat normally.

Batteries will naturally drain after they are removed from the boat. There is no way to prevent the batteries from draining below the minimum voltage level naturally. If the batteries' voltage drops below the minimum safe voltage level during this process, it will be unrecoverable. This type of failure will not be under warranty.

Component Failure

MOSFETs on each battery board may prevent batteries of different voltage levels from cross-charging each other. If one of these MOSFETs fails, batteries of higher voltage levels may begin charging it. In embodiments involving a high discharge rate of batteries, overcurrent events may occur. As a backup to MOSFETs, embodiments may include a fuse that is user-replaceable. This fuse may also provide a backup for other component failures on the battery PCB. The failure of the temperature sensor, voltage level indicator, or current indicator may result in BMS disconnecting the battery, preventing damage to the battery pack or danger to the user.

Status Indicators

A charge indicator light may be included with each battery container, and can be activated by the user pressing a button.

Charger

This document outlines example features for a charger. One or more of the disclosed charger features may be employed to take advantage of the functionality built into the BMS and Battery Pack designs.

Charger Features

A charger may be configured to allow charging of the kayak in a single step process. The charger may plug into the BMS and automatically charge all battery packs independent of battery number and chemistries (Lead Acid, NiMH, and Lithium). Besides providing the user convenience, the charger may record the charging process for each battery pack. The recorded information may be used during operation of the kayak to maximize the discharging of the battery packs by taking parameters (such as the amount of energy put into the battery pack, aging, and others) into consideration when calculating the available capacity and the estimated remaining runtime. The recorded data may also be used for troubleshooting and analysis of battery performance.

The following is a brief summary of the BMS and the Battery Pack functionality, which provides the proper context for the description of the charger.

BMS

The BMS interfaces between either the controller or the charger, and the Battery Packs. In either configuration, the BMS may act as a "slave", provide information such as the number of battery packs installed, the chemistries, capacity, voltage, etc. to the controller or the charger, which take on the role of a "master". The masters request information when needed and instruct the BMS to take action such as connecting and disconnecting Battery Packs.

Battery Pack Controller

The Battery Pack Controller sits inside each battery pack, stores information about the pack, and permanently measures the pack's voltage, current, and temperature. It also protects the pack on a hardware level from over current (OC) and under voltage (UV). Depending on the chemistry, the BPC monitors each cell during the charging process from over voltage (OV) and during the discharge cycle from under voltage (UV).

The charger relies on and builds upon the functionalities of the BMS and the BPCs for Battery Pack Identification, Voltage and current measurement, Temperature measurement, and Battery cell protection.

Charger

For automatic charging as outlined in this section, the charging module may include the following features:

- Microprocessor controlled to (a) communicate with the BMS (b) to generate charging patterns and to adjust them based on the Battery Pack ID returned by each BPC.
- Driver circuits to provide charging currents either in constant voltage or constant current mode.
- Current limiting features to avoid cell overheating.
- Real-time clock to add time stamps to the Battery Pack data.

In addition to the features listed above, the charger may include features configured to enable the following:

- Monitoring total Coulombs during charging for plausibility check
- Timing the charging process
- Keeping the batteries charged over time via periodic and automatic trickle charging will help to avoid loss of energy and battery life over long periods of inactivity
- Operating with the Battery Packs installed in the boat, or out of the boat (such as in a garage over the winter)
- Controlled discharge of NiMH batteries during long storage periods The following DC power source and UI features may be included with the charging module:

- User interface, either implemented with LEDs or a small LCD. The interface communicates the estimated remaining charging time, the charging process i.e. Pack 1 of 3, as well as general and failure messages. The kayak's operator keypad and LCD may be used for that purpose. The Status and Battery sections on the LCD may be used specifically to communicate charger status and information. As an alternative, a separate charger UI may plug into the charging unit.
- Mode selection allows the user to charge a specific Battery Pack versus all packs in a batch operation.
- A 5VDC supply to run the logic portion of the charger module
- Charging power source (DC input for 30V operation, >500 W)

Plausibility Check

In addition to the charging parameters listed in the Charger Specification section, the charger may take the actual capacity (per data storage on the Battery Pack) into consideration. Discrepancies between "capacity needed" and capacity added (Coulombs) may trigger warnings and/or alerts.

Current Limiter

The charger may include timer functionality to supervise the charging process and abort if the "End Of Charge" criteria is not reached within the allotted time frame.

Charger Implementation

The charger may comprise three parts: the charging module, the charging DC power source and an operator interface.

Charging Module

The charging module may be configured to be small and light enough to fit into the kayak and is permanently connected to the battery voltage, the 5V logic supply and the data bus. It stays disabled until turned on with a switch from the charger operator interface or until the module detects a DC power source. Current design calls for the charging module to automatically turn on and take control of the system data bus and begin a charging sequence any time two conditions are met (a) main controller is turned off, and (b) a DC power source is present.

DC Power Source

The DC power source may be a separate device that provides the DC power source for the charging module. There can be different models based on the input source:

- AC switching power supply
- AC linear power source
- Solar panel converter

Charger Operator Interface

The kayak's main operator console may be used for on-boat charging. Alternatively, the interface can be implemented as a separate device that plugs into the charging module. The alternative interface may be used for the off-boat charging method. A completely different method could be a wireless charger control using a device such as a PDA, phone, etc.

On-Boat Charging

For on-boat charging, the DC Power Source plugs into the charging module that is firmly installed in the kayak. There need not be other inputs.

Off-Boat Charging

For off-boat charging, the charging architecture of the kayak may be duplicated. An alternative BMS, charging module, cabling harness and a separate operator interface may be used. The DC power source plugs into the charging module as it would for on-boat charging. The DC power source may plug in to the off-boat charging module to accommodate solar or other options and/or may be integrated into the physical charger unit to reduce complexity/wiring.

Alternative Charger Configurations

Off-the-Shelf Charger: The simplest approach to charging the Battery Packs is the purchase of dedicated chargers, e.g., 24V chargers, for each battery type. The user may explicitly hook each Battery Pack up to a corresponding charger. An adapter may be used to connect the charger to the Battery Pack and to disable the Battery Pack circuit. This approach may be used for SLA, LiFe, and NiMH batteries. For LiFe and NiMH batteries, a temperature sensor may cut off the charger in case of over temperature.

Modifying an Off-the-Shelf Multi Chemistry Charger: Another approach may employ a multi chemistry battery charger. In this scenario, the existing hardware of the charger may be exploited.

Charger User Interface

This section describes control elements for the charger, such as switches, buttons, touch screen inputs, etc.:

On/Off: This is the element, which explicitly turns the charger on/off. In addition, an auto-start feature automatically detects the DC power source and starts the charger. The latter facilitates on-board charging from solar panels.

Start (Charging): The start charging element initiates a charge cycle for either all the battery packs connected to the BMS Print or for a selected battery pack. The selection is made via selection buttons. Note: when all battery packs are selected, the charging sequence may be fixed, starting with pack 1 followed by pack 2 etc.

Once the charging of all battery packs is complete, the charger may automatically switch to long-term charging/maintenance/reconditioning mode. As for normal charging, the maintenance program may adapt to a pack's chemistry.

Selection: Selection elements may work in concert with charge options displayed on a LCD screen. Charge options may include: Charge all battery packs; charge a specific pack (e.g. pack #1-#6) according the battery packs slot numbering schema. Long term charging may automatically poll and maintain all connected battery packs.

Error Conditions

There may be two categories for error conditions. The first category allows the user to take corrective actions, the second category informs the user about a failure for which corrective action may not be available.

Errors in the first category may include:
No battery packs are connected
Unable to communicate with a specific battery pack
Errors in the second category may include:
Over temperature for a battery pack
Over voltage of a battery pack
Charging time out for a battery pack
Excessive current for a battery pack
Voltage and current out of range on the charger itself Charging Process The charging process may be displayed on an LCD panel to inform the user about the selected charge mode, battery pack selection(s) and the estimated time for completion. For example:
"Charging—All packs (2 of 3)—6 h remaining"
"Maintenance—Idle"
"Maintenance—All packs (1 of 3)"

Charging Phases

The charger may be configured to charge in several different phases, for example:
Phase I: Fast charging; the limiting factor is cell over heating
Phase II: Slow charging to achieve maximum battery capacity.
Phase III: Maintenance for long term storage/charge maintenance.

Battery Pack Data Update

While charging a Battery Pack, the charger may update parameters stored in nonvolatile memory in each Battery Pack. Parameters such as the following may be updated: Nominal battery capacity, Current capacity, Coulombs added during last charging cycle, Charging cycle count, Partial charging cycle count, Min. Operating voltage, Operating current, Max. Temperature, Max. Charge current, Max. Charging time, Charging Method ID, End Of Charge Criteria ID, Max. charging voltage, Production Date, Most recent charging date and time, Total discharge time.

Auto Pilot

An auto-pilot may integrate into the controller and may support any of the following functions:

Take Me Home: This function gives the user the ability to initially press a button on the controls at the beginning of the trip [or to use a default home location], to travel through waypoints, and then to be returned to the original location by returning through the previous waypoints. A take me home starting point may be defined as a point to which the boat will eventually return and where the auto pilot begins recording waypoints. A take me home straight function may take a straight line path home from a current location.

"Hold Course—Compass": This function keeps a current compass course (as may be computed from the GPS). The current nautical direction the boat is facing may be identified, and the boat may continue going that direction for an indefinite period of time.

"Hold Course—Target": This function may project forward to a point that is some designated distance, such as 100 meters in the distance, and may adjust course to get to that point, regardless of current drift, wind, etc. Hold Course—Target mode may for example be entered by pressing the Hold Course button a second time (with or without delay after the first press). When Hold Course—Target mode is engaged, the boat may begin travelling to the first waypoint. Before the boat reaches the midway point (e.g., a 50 m mark), the boat's direction may be fixed on the waypoint that is 100 meters from the initial waypoint. Once the boat passes the midway point along the path (e.g., as defined by being less than 50 meters from the next waypoint), the boat's target may change from one that is 100 meters from the initial point to one that is 150 meters from the initial point. This prevents the boat from undergoing too much rapid change while nearing each waypoint.

Electronic compass: This function may indicate north in one area of the LCD screen, within a tolerable accuracy, such as 5 degrees (72 segments).

Speed vs ground: This function may deliver speed of boat, e.g., in Miles Per Hour (MPH) relative to ground rather than to water.

User Interface and Usage Cases

An example user interface button layout for a membrane switch may comprise a "Starting Point" button, a "Take Me Home" button, a "Hold Course" button, and a "Cruise" button.

Steps for setting "Home" position—default "Starting point" for "Take Me Home" operation may include, for example:
"Starting point" is pressed and held for predetermined time interval such as 5 seconds
The current position of the boat is set as the boat's default starting position.
LCD displays "Default Home set"
Steps for "Take Me Home" may include, for example:
"Starting point" button is depressed for less than predetermined time interval such as less than 5 seconds.
LCD displays "Today's Home Set"
if the starting point button is not depressed, the default starting point is the "Default Home" position that is set by the user. If no default is set and not Today's home is set, pressing "Take Me Home" sets course to where you most recently booted the controller and displays a message: "no home set" for predetermined time interval, e.g., 3 seconds, then "heading towards" for predetermined time interval, e.g., 3 seconds, then "startup place" for predetermined time interval, e.g., 3 seconds .
GPS begins recording waypoint coordinates within "X" feet of actual location "Y" times per minute.
LCD indicates that GPS is recording waypoints. (When GPS is no longer recording waypoints, LCD stops indicating)
Events that could all logically follow "Today's Home Set" (above) may include the following.
User presses "Take Me Home": GPS stops taking waypoints and begins navigating to the closest waypoint. After intersecting with the first waypoint, the boat navigates to the waypoint that was taken before and begins to track back. LCD indicates that "Take Me Home" is engaged.
Controller reboots (either by user cycling on/off, depressing E-stop, battery failure, or one of two kill switches is triggered): boat resumes taking waypoints after reboot.
User presses "Starting point": Nothing happens (assumed misuse by user)
User presses "Stop": boat stops travelling through waypoints and awaits instructions from user.

User begins navigating either by use of joystick, foot pedal controls or keyfob: Nothing happens if foot pedals are pressed; If user moves joystick for more than predetermined time interval, e.g., 2 seconds, the boat direction and speed changes to that indicated by the joystick's position. The speed may be automatically set at the last "Held Speed". The "Held Speed" is the speed the user sets by holding the joystick within a selected speed band (e.g., a 10% wide band as shown below) for more than some time interval, e.g., 0.5 seconds. If the joystick is not "held" in a position for more than 0.5 seconds, the boat's speed may return to the one that was set before the user began navigating with the joystick. If the keyfob is pressed 2 times within some time interval, e.g., 5 seconds, the boat's autopilot disengages and the keyfob controls the boat. Once the user releases the joystick, the craft begins to steer toward the closest waypoint along the path. The net effect is that the user temporarily controls the direction of the boat and can change the cruise speed by adjusting the joystick in the forward direction for more than some time interval, e.g., 2 seconds. If the user moves the joystick backward for more than some time interval, e.g., 1 second, the boat goes into reverse at the speed indicated by the position of the joystick and the message "Auto-Pilot Disengaged" is displayed.

User presses "Take Me Home" and "Hold Course" simultaneously: Boat begins navigating to the home location.

Changing speed: At any time during automatic control, speed may be adjusted by some increment, e.g., 5% by moving the joystick forward or backward, respectively, beyond a predetermined position, e.g. the 50% point, for less than some interval, e.g., 2 seconds.

"Hold Course" Operations

"Hold Course" operations may include, for example, the following.

"Hold Course" is pressed once. If satellite signal is not available, LCD displays "satellite unavailable" error message. If satellite signal is available, boat's speed is set at "neutral speed". As boat continues moving, GPS compares direction the boat is facing with the original direction and the boat's controller makes adjustments to strut's position to move boat toward the original heading. When corrections occur the boat's speed is set at the "correction speed". An indication is given on the LCD that "Hold Course" mode is engaged. When "Hold Course" is no longer engaged, LCD indication turns off.

"Hold Course" is pressed twice, meaning user wants to hold course and correct for current set/drift, aiming to a specific target ahead (called "Hold Course—Target" mode). If satellite signal is not available, LCD displays "satellite unavailable" error message. If satellite signal is available, boat's speed is set at "neutral speed" (neutral speed is defined as the speed necessary to eliminate the added drag of the prop when it is down). As boat continues moving, GPS compares straight line projection waypoints with current position and controller makes adjustments to strut's position to move boat toward straight line projection. When corrections occur and the boat's speed is set at "neutral speed" the boat speed is to the "correction speed" (any arbitrary predetermined correction speed, e.g., a speed between 25% and 50% of the maximum speed). An indication is given on the LCD that "Hold Course—Target" mode is engaged. When "Hold Course" is no longer engaged, LCD indication turns off.

"Hold Course" is pressed once with "cruise": Functionality is the same as when "Hold Course" is pressed once, described above, except that the speed is set at current speed.

"Hold Course" is pressed twice while holding cruise: Functionality is the same as "Hold Course—Target" above except that the speed is set at current speed.

If Hold Course—compass mode is engaged, pressing Hold Course again goes to Hold Course—Target mode. Pressing a third time turns Hold Course off, and pressing yet again cycles back to Hold Course—Compass. Net is that the Hold Course button works like a rotary switch, and the display tells the user which mode it's in, or if it's off.

If Hold Course is not engaged at all, double-clicking the Hold Course button goes immediately to Hold Course—Target. If Either Hold Course mode is engaged, double clicking turns Hold Course off.

User presses "Stop". Boat stops and disengages the Hold Course sequence and awaits command from user.

Controller reboots (either by user cycling on/off, depressing E-stop, battery failure, or triggering one of two kill switches): boat disengages Hold Course and awaits commands from user.

User begins navigating by using either joystick, foot pedal controls or keyfob. Nothing happens if foot pedals are pressed. System disengages if user moves joystick for more than a predetermined time interval, e.g., two seconds or keyfob is pressed 2 times within 2 seconds. Message is displayed "Auto-Pilot Disengaged".

Adjusting course: If the boat is in "Hold course" mode, the user can adjust the course by some predetermined increment, e.g., 3 degrees by moving the joystick either right or left past some predetermined position, e.g., a 50% point (from vertical) for less than some time interval, e.g., 2 seconds and then returning the joystick back to a position less than 50% from center. If the joystick moves past some predetermined position, e.g., past the 95% point, the adjustment to the boat's course may be a greater increment, e.g., 10 degrees. If the user moves the joystick away from center for more than a predetermined time interval, e.g., 2 seconds, the boat's direction may come temporarily under control of the joystick. The boat's direction is adjusted and then the new course is set as the course the boat is traveling on after the joystick has been re-centered for at least some predetermined interval, e.g., 1 second.

Changing speed: If the joystick is moved forward away from center for more than some predetermined interval, e.g., two seconds, the "Held Speed" is also set as discussed before in the "Take Me Home" section. If the joystick is moved backward away from center for more than some predetermined interval, e.g., 1 second, the boat's speed is set to the currently indicated speed.

At any time during automatic control, speed is adjusted by some predetermined increment, e.g., 5% by moving the joystick forward or backward, respectively, beyond some predetermined position, e.g., a 50% point for less than some predetermined interval, e.g., two seconds. If the joystick is moved forward beyond another predetermined position, e.g., the 95% mark, the boat's speed increases by a greater interval, e.g., 10%.

Auto Pilot Cables and Installation

An auto pilot module may be attached as an add-on to the main controller for K1 1000. To install this module into a manufactured, calibrated, and tested K1, the user may plug a cable from the module into a port on the controller. The module may also have a port that takes data from a 3rd party AUTO PILOT using, e.g., a NEMA 182 protocol.

An auto pilot module may have an electrical connector for a waterproof plug so a 3rd party device can be plugged in, as well as a mount for the 3rd party device.

Errors, Failures, Conflicts and Error Messages

Errors, failures and conflicts may occur in the following example situations, with the following example notifications/responses.
1. Pressing "Hold Course" or "Take Me Home" when:
   a. Propulsion is Raised
      i. Error message: "Lower prop"
   b. Motor is disconnected
      i. Error message: "Motor connect"
   c. Cruise is engaged
      i. Response: Program is engaged and boat's speed is set to current cruise speed.
2. Pressing Hold Course when Take Me Home is engaged
   a. Error message "Press stop"
3. Pressing Take Me Home when Hold Course is engaged
   a. Error message "Press stop"
4. When satellite is not available or signal cannot be found
   a. Error message "No Satellite"
5. When Autopilot is not installed
   a. Error message "No Autopilot"
6. "Hold Course" or "Take Me Home" is engaged
   a. Battery drops below "X"
      i. Error message "Low Batt"
   b. Battery drops below "Y"
      i. Error message "Low Batt"
      ii. Error message "Batt damage"
      iii. Response: If no action by user, boat shuts down automatically within 5 minutes or switches to low power mode (very slow speed 2 mph)
   c. Battery drops below "Z"
      i. Error message "No Batt"
      ii. Error message "shut down"
      iii. Response: Prop raises
      iv. Response: Boat shuts down

CONCLUSION

The novel approaches described herein for a motorized personal watercraft provide several advantages over prior approaches. In the foregoing specification, the invention has been described as applicable to an electric kayak, where the special advantages of the described apparatus are very desirable. However, the same invention may be applied to other personal watercraft.

Unless otherwise indicated, all numbers expressing quantities used in the specification and claims are to be understood as being modified in all instances by the term "about" or "approximately." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The invention claimed is:
1. An electrically powered watercraft having an intended forward direction of travel, the watercraft comprising:
   a seat formed in a cavity defined by a hull of the watercraft;
   propulsion unit cavity defined by the hull of the watercraft, wherein the propulsion unit cavity is separate from the cavity with the seat; and
   a steerable retractable propulsion unit comprising:
      a motor;
      a driveshaft;
      a propeller;
      wherein the driveshaft transfers force from the motor to the propeller; and
      wherein the propulsion unit is removable from the watercraft, the propulsion unit comprising a selective connection that secures the driveshaft and establishes electrical connections between the propulsion unit and watercraft.

2. The electrically powered watercraft of claim 1, further comprising a secondary motor configured to retract the propeller, wherein the secondary motor is coupled to a gear, and wherein the gear is coupled to a raise/lower strut, such that when the secondary motor turns the gear, the raise/lower strut applies a force that rotates the driveshaft and propeller about a pivot point.

3. The electrically powered watercraft of claim 1, further comprising a magnetic limit switch and one or more magnets, wherein the magnetic limit switch is configured to detect a magnet position and signal a rotational position of the driveshaft and propeller to a controller.

4. The electrically powered watercraft of claim 1, wherein the driveshaft and propeller are configured with a latch that releases when a given impact force is exceeded, allowing the driveshaft and propeller to fold upward when impacted.

5. The electrically powered watercraft of claim 1, wherein the driveshaft and propeller are configured with a hinge with a safety pin, allowing the driveshaft and propeller to fold upward when impacted.

6. An electrically powered watercraft having an intended forward direction of travel, the watercraft comprising:
    a seat formed in a cavity defined by a hull of the watercraft;
    a propulsion unit cavity defined by the hull of the watercraft, wherein the propulsion unit cavity is separate from the cavity with the seat; and
    a steerable retractable propulsion unit comprising:
        a motor;
        a driveshaft;
        a propeller;
        wherein the driveshaft transfers force from the motor to the propeller; and
        wherein the driveshaft and propeller are configured with a latch that releases when a given impact force is exceeded, allowing the driveshaft and propeller to fold upward when impacted.

7. The electrically powered watercraft of claim 6, wherein the latch comprises a flexible latch that gives way under the force of an impact.

8. The electrically powered watercraft of claim 6, wherein the driveshaft and propeller are configured with a hinge with a safety pin, allowing the driveshaft and propeller to fold upward when impacted.

9. The electrically powered watercraft of claim 6, wherein the propulsion unit comprises a pull-style motor, said pull-style motor comprising a push-style trolling motor, wherein the battery leads on the push-style trolling motor are reversed, and wherein the push-style trolling motor is rotated 180 degrees, allowing the driveshaft and propeller to fold upward when impacted.

10. The electrically powered watercraft of claim 6, wherein the propulsion unit is removable from the watercraft, the propulsion unit comprising a selective connection that secures the driveshaft and establishes electrical connections between the propulsion unit and watercraft.

11. The electrically powered watercraft of claim 6, further comprising a secondary motor configured to retract the propeller, wherein the secondary motor is coupled to a gear, and wherein the gear is coupled to a raise/lower strut, such that when the secondary motor turns the gear, the raise/lower strut applies a force that rotates the driveshaft and propeller about a pivot point.

12. The electrically powered watercraft of claim 6, further comprising a magnetic limit switch and one or more magnets, wherein the magnetic limit switch is configured to detect a magnet position and signal a rotational position of the driveshaft and propeller to a controller.

13. An electrically powered watercraft having an intended forward direction of travel, the watercraft comprising:
    a seat formed in a cavity defined by a hull of the watercraft;
    a propulsion unit cavity defined by the hull of the watercraft, wherein the propulsion unit cavity is separate from the cavity with the seat; and
    a steerable retractable propulsion unit comprising:
        a motor;
        a driveshaft;
        a propeller;
        wherein the driveshaft transfers force from the motor to the propeller; and
        wherein the driveshaft and propeller are configured a hinge with a safety pin, allowing the driveshaft and propeller to fold upward when impacted.

14. The electrically powered watercraft of claim 13, further comprising a secondary motor configured to retract the propeller, wherein the secondary motor is coupled to a gear, and wherein the gear is coupled to a raise/lower strut, such that when the secondary motor turns the gear, the raise/lower strut applies a force that rotates the driveshaft and propeller about a pivot point.

15. The electrically powered watercraft of claim 13, further comprising a magnetic limit switch and one or more magnets, wherein the magnetic limit switch is configured to detect a magnet position and signal a rotational position of the driveshaft and propeller to a controller.

16. An electrically powered watercraft having an intended forward direction of travel, the watercraft comprising:
    a seat formed in a cavity defined by a hull of the watercraft;
    a propulsion unit cavity defined by the hull of the watercraft, wherein the propulsion unit cavity is separate from the cavity with the seat;
    a steerable retractable propulsion unit comprising:
        a motor;
        a driveshaft;
        a propeller;
        wherein the driveshaft transfers force from the motor to the propeller; and
    a secondary motor configured to retract the propeller, wherein the secondary motor is coupled to a gear, and wherein the gear is coupled to a raise/lower strut, such that when the secondary motor turns the gear, the raise/lower strut applies a force that rotates the driveshaft and propeller about a pivot point.

17. The electrically powered watercraft of claim 16, further comprising a magnetic limit switch and one or more magnets, wherein the magnetic limit switch is configured to detect a magnet position and signal a rotational position of the driveshaft and propeller to a controller.

18. An electrically powered watercraft having an intended forward direction of travel, the watercraft comprising:
    a seat formed in a cavity defined by a hull of the watercraft;
    a propulsion unit cavity defined by the hull of the watercraft, wherein the propulsion unit cavity is separate from the cavity with the seat;
    a steerable retractable propulsion unit comprising:
        a motor;
        a driveshaft;
        a propeller;
        wherein the driveshaft transfers force from the motor to the propeller; and
    a magnetic limit switch and one or more magnets, wherein the magnetic limit switch is configured to detect a magnet position and signal a rotational position of the driveshaft and propeller to a controller.

* * * * *